United States Patent [19]
Russell

[11] Patent Number: 4,460,989
[45] Date of Patent: Jul. 17, 1984

[54] APPARATUS FOR IMPROVING FOCUS DURING PLAYBACK OF AN OPTICAL DATA RECORD

[75] Inventor: James T. Russell, Salt Lake City, Utah

[73] Assignee: Eli Soloman Jacobs, New York, N.Y.

[21] Appl. No.: 275,717

[22] Filed: Jun. 22, 1981

[51] Int. Cl.³ .............................................. G11B 7/00
[52] U.S. Cl. ............................. 369/45; 369/108; 369/110; 250/201; 250/225; 250/226; 350/96.3
[58] Field of Search ............... 369/45, 122, 108, 110; 250/201, 578, 227, 226, 225; 350/96.34, 96.18, 96.3; 264/1.5; 350/299

[56] References Cited
U.S. PATENT DOCUMENTS

| | | | |
|---|---|---|---|
| 3,191,490 | 6/1965 | Rabinow | 353/26 R |
| 3,235,672 | 2/1966 | Beguin | 369/111 |
| 3,501,586 | 3/1970 | Russell | 369/59 |
| 3,848,095 | 11/1974 | Wohlmut | 369/45 |
| 3,891,794 | 6/1975 | Russell | 369/48 |
| 3,946,367 | 3/1976 | Wohlmut | 369/45 |
| 4,051,528 | 9/1977 | Takeda | 369/45 |
| 4,074,314 | 2/1978 | Velzel | 369/45 |
| 4,090,031 | 5/1978 | Russell | 365/127 |
| 4,133,600 | 1/1979 | Russell | 350/3.72 |

OTHER PUBLICATIONS

*Light Scattering of Small Particles*, by Holst, Published by John Wiley & Sons, ©1957, pp. 172-199.

*Primary Examiner*—Alan Faber
*Attorney, Agent, or Firm*—Klarquist, Sparkman, Campbell, Leigh & Whinston

[57] ABSTRACT

An apparatus for improving the focus of a digital optical record and playback system is described which provides plural simultaneous focal paths of different lengths for playing back or recording a digital optical data record. These focal paths may interact a common bit portion on a data record, successive bit positions in the same row of data on the record, or bit portions on adjacent tracks of data on the record. In certain embodiments, a selection circuit is utilized for evaluating the focal paths and selecting one which results in an improved focus. Data records having recorded bits of data of extended depth are also described to facilitate focusing during playback of the data record.

35 Claims, 25 Drawing Figures

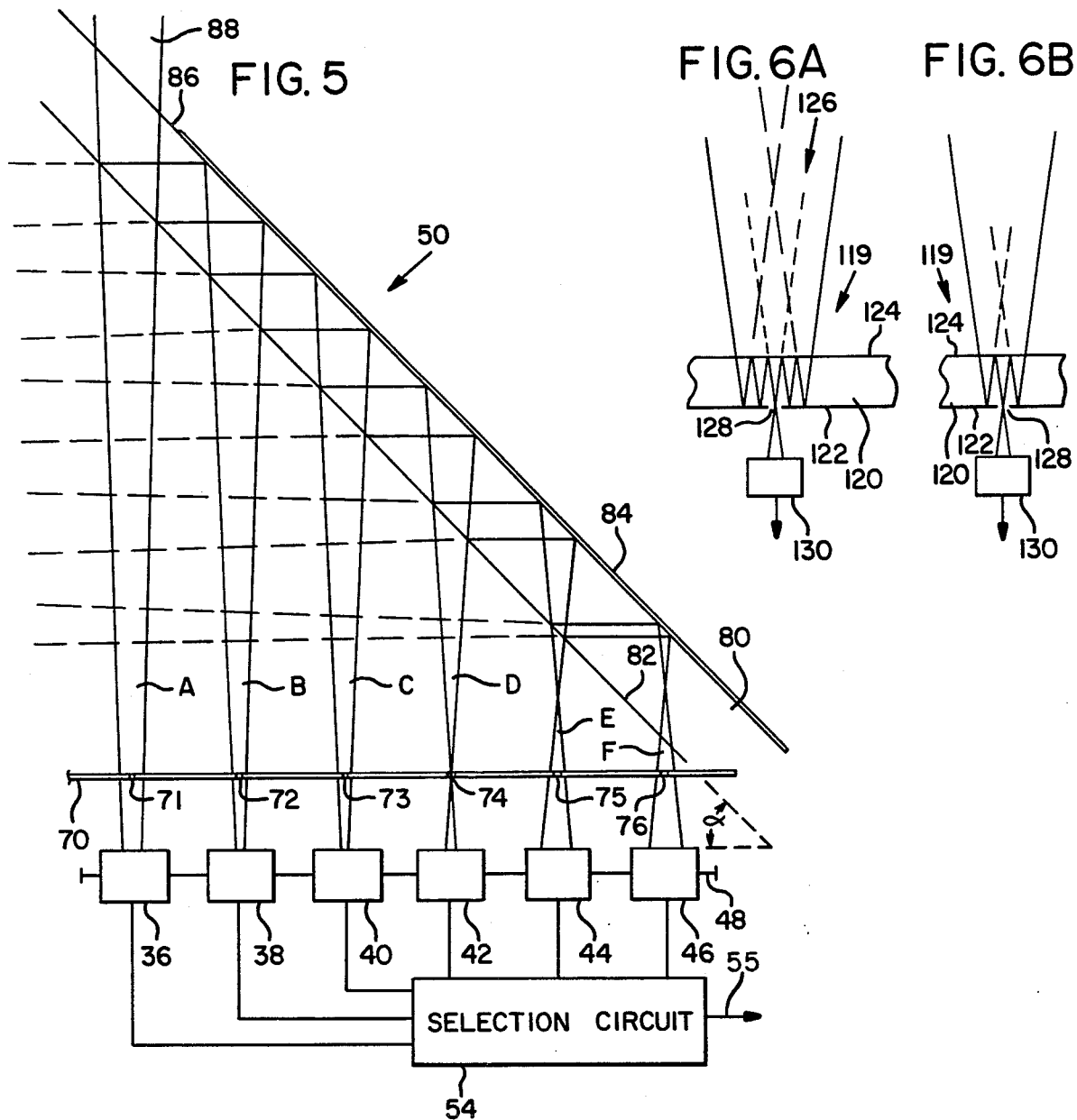
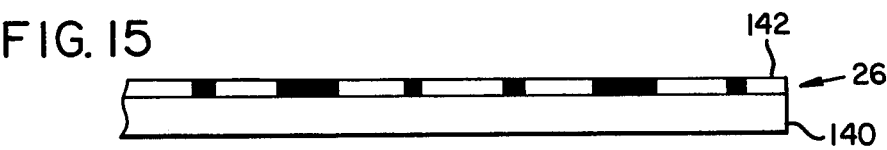
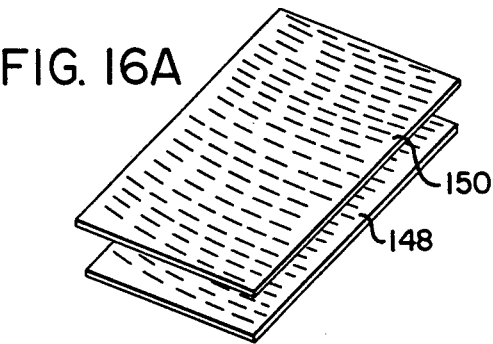
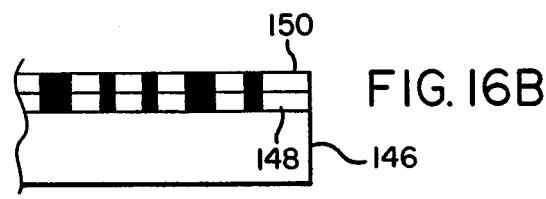

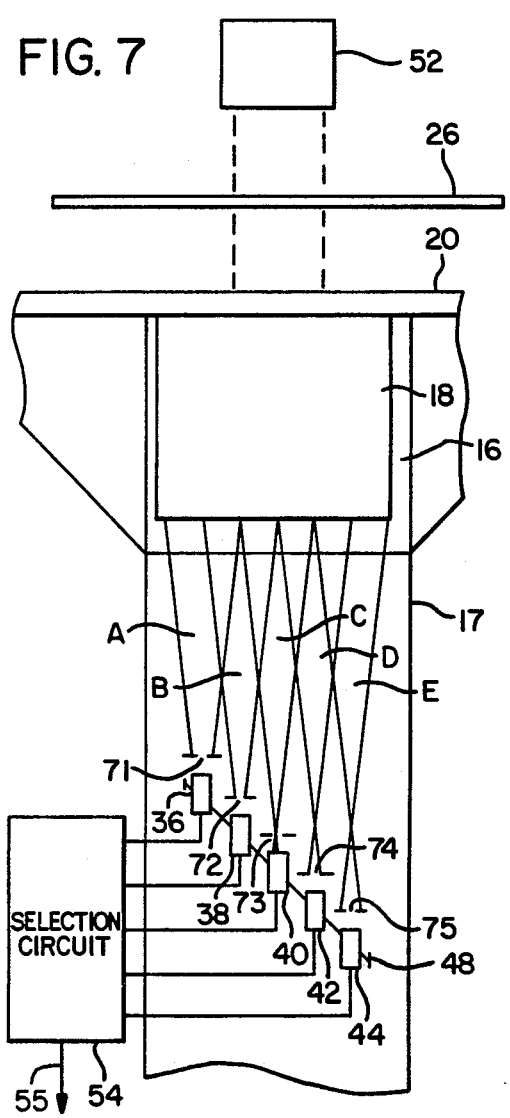
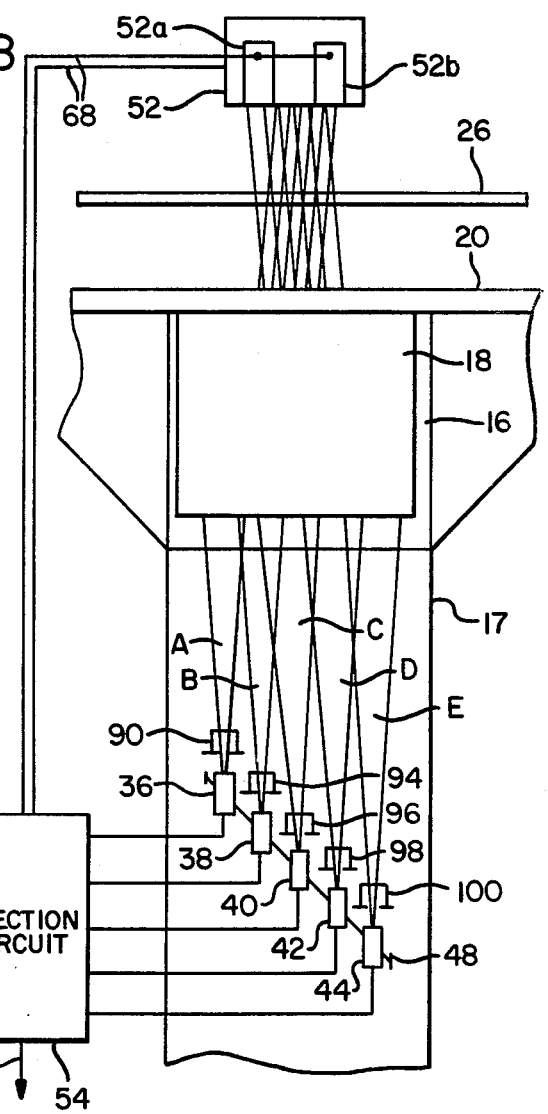
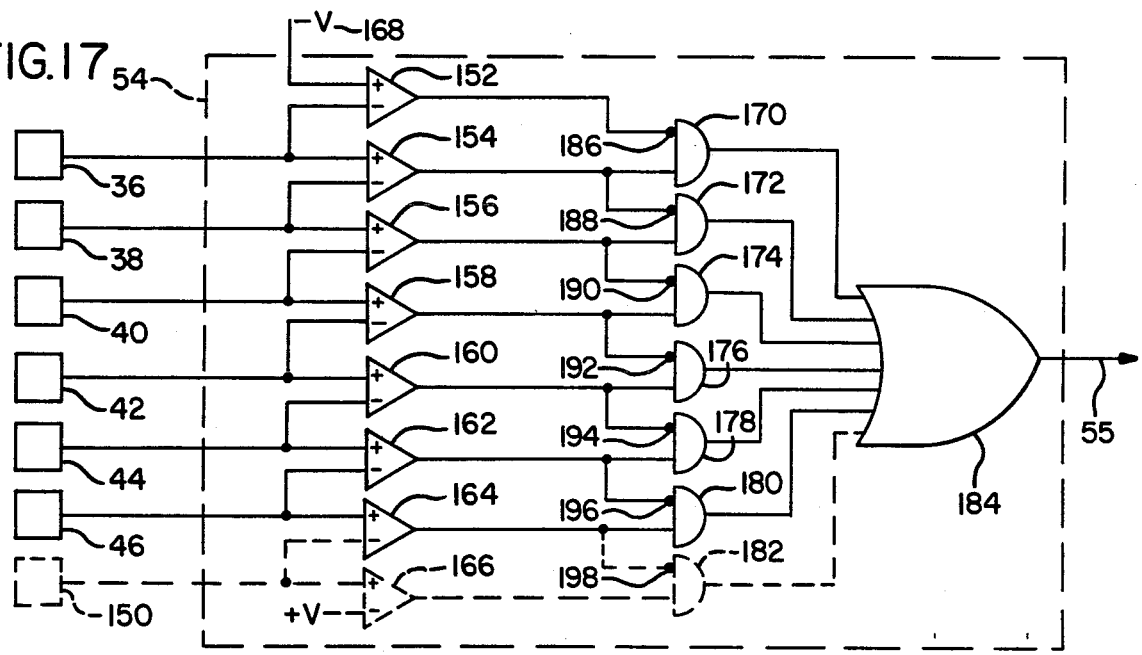

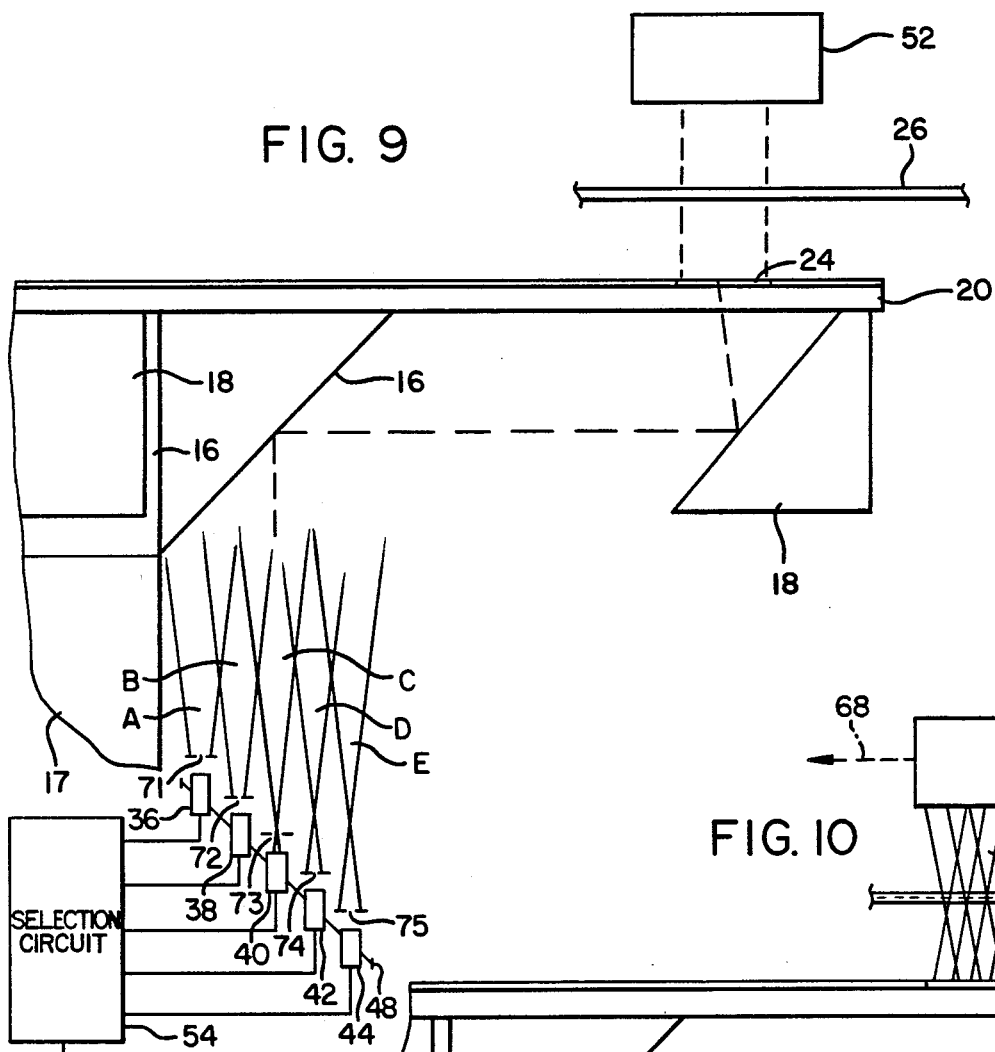
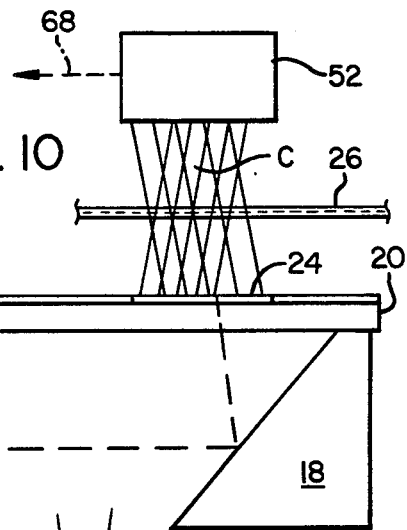
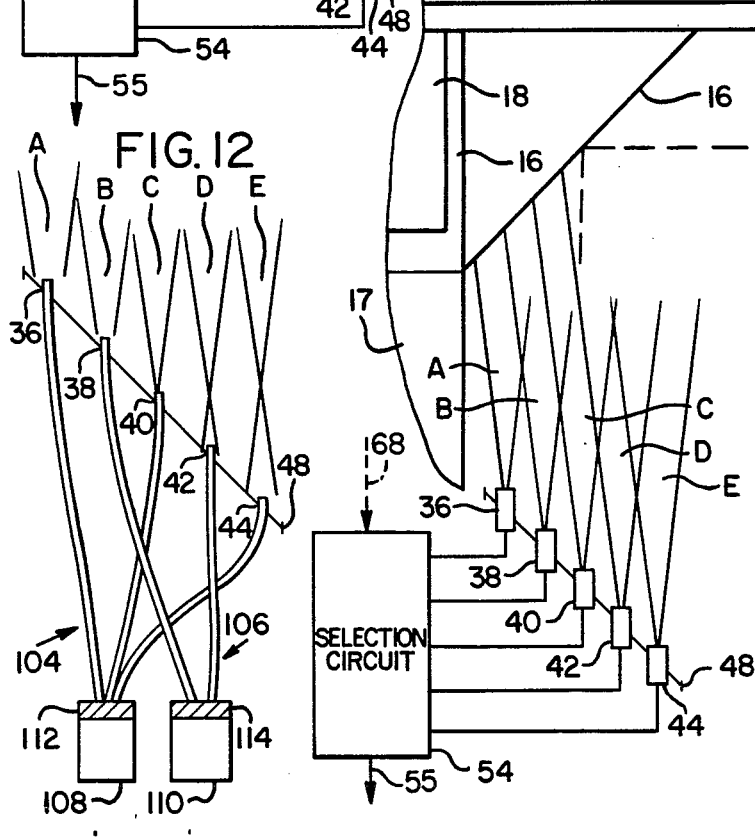
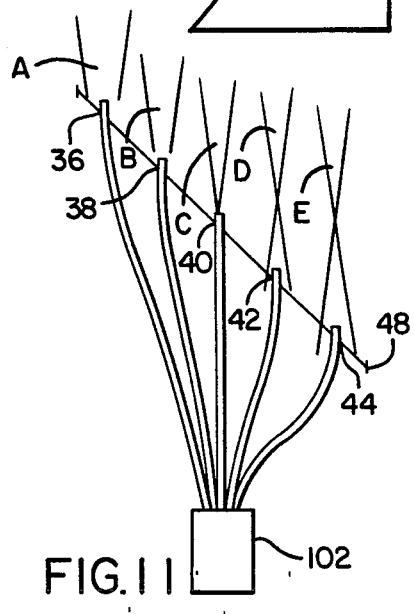

APPARATUS FOR IMPROVING FOCUS DURING PLAYBACK OF AN OPTICAL DATA RECORD

BACKGROUND OF THE INVENTION

The present invention relates to improvements in devices for playing back digital optical data records and improvements in recording data on digital optical data records resulting in enhanced focus during playback. More specifically, the invention relates to an apparatus for improving the focus of playback light on the data layer of a digital optical data record during playback of the record.

A system for storage and retrieval of information of extremely high densities is described and claimed in U.S. Pat. No. 3,501,586 granted to James T. Russell on Mar. 17, 1970, entitled "Analog to Digital to Optical Photographic Recording and Playback System" and assigned to the assignee of the present invention. In such a system, a single pulsed light source is focused to an extremely small focal spot which is optically scanned over a sensitive medium for either the recording or playback of information. Audio or video information can be recorded through the conversion of the analog information to digital information which is then used to modulate the light source. The resulting record appears as a multiplicity of digit-representing spots arranged on the sensitive medium with a high packing density. The positioning of optical elements so as to focus on the sensitive medium tends to be critical in making sure the record is not blurred or out of focus. A small focal spot size implies a short depth of focus so that the recording medium must be accurately situated and substantially flat to prevent the blurring or overlapping of the recorded information.

In a particular instance, information may be recorded with a scanning disc which is rotated past a photosensitive plate. Relative linear movement is also provided between the scanning disc and the photosensitive plate to prevent the overlapping of data during recording. A plurality of microscope objectives are positioned upon the scanning disc, each one in turn receiving a beam of light and tracing an arcuate path across the face of the photosensitive plate to record paths or tracks of digital spots on such plate. As will be appreciated by those skilled in the art, the depth of focus of the microscope objectives is such that the spacing between the scanning disc and the photosensitive plate must be accurately predetermined.

Also, the accurate spacing between the scanning disc and data recorded on the data record must be accurately predetermined for playback purposes as well. Variations in the positioning and flatness of the record, unless compensated for by focus correction, result in an inability to focus on the data contained on the record and hence the inability to read the record with accuracy. In other words, in optical digital recording systems, it is essential that the data layer should be within the effective focal depth of the scanning lens.

One typical prior art approach in maintaining focus during playback of an optical data record involves the use of very costly, high-precision, components manufactured to extremely close tolerances. Such components minimize positioning of the data layer outside the focal depth of the scanning lens.

As another approach, complex costly mechanisms are employed which sense an error in the focus and which physically move an optical element to make a correction. Exemplifying such devices is the device disclosed in U.S. Pat. No. 3,848,095 of Wohlmut et al. The device of Wohlmut plays back a digital optical data record with stacked layers of data by focusing on data located on one layer at a time. More specifically, Wohlmut provides a first electro-optical system which follows an information track on a given layer of data. This first system controls the positioning of an optical element of a spaced apart second electro-optical system which reads data from the given data layer. In this regards, the first system has a movable lens and a split photodetector arrangement for determining the lateral position of the lens on a track of data. Depth of focus control is determined utilizing a dither signal to vibrate the lens in a normal or depth direction and evaluate the results. A servo mechanism moves a lens of the second in response to signals from the first system to thereby control the depth and lateral position of the focus of the device. In lieu of moving the lens to correct the focus, Wohlmut also mentions moving plural photosensors relative to the data record. Moreover, in a specific example, the rows of data of Wohlmut are eight bits wide. In this example, eight photodetectors are utilized and understood to operate such that each detector is focused on one of the bits making up the width of the data row. Also, U.S. Pat. No. 3,946,367 of Wohlmut et al is understood to operate in a similar manner except that tracking is accomplished with a single lens operable in conjunction with the first and second electro-optical systems. Thus, the Wohlmut devices are illustrative of devices in which optical elements are physically moved to make a focus correction.

Another approach to improve the focus during playback of a digital optical data record is described in U.S. Pat. No. 4,133,600 issued to James T. Russell et al. on Jan. 9, 1979. This reference discloses the formation of holographic lenses on a substantially transparent scanning disc, wherein a line focus is the object of each hologram. The hologram is then utilized during playback to reconstruct the line focus at the location of the data record to be scanned. This provides an elongated focus for intersecting the recording medium and thereby minimizes the tolerance requirements in regard to the positioning or flatness of the scanned record. However, this reference discloses an entirely different approach than that of the present invention, for improving the focus of a digital optical data system.

SUMMARY OF THE INVENTION

The present invention discloses an apparatus which improves the focus of a scanning light beam upon a digital optical data record.

In one form of the invention, plural simultaneous focal paths of different lengths are provided, each passing through a common bit of data. Light is transmitted along these focal paths during playback of a digital optical data record. The focal path resulting in improved focus is selected from these plural focal paths and utilized for playing back the record. More specifically, in this form of the invention, plural cells are provided, one associated with each focal path. The cells may either be light sources, such as an array of light-emitting diodes, or optical detectors such as photo cells. Each focal path extends from an associated cell to a light-directing means which generally causes light traveling along the focal path to pass through a common data bit, and to a light-receiving means if the cells are light sources or to a light-transmission means if the cells are detectors. The cells are supported in a predetermined array such that the focal paths are of different lengths. A selection circuit is provided for evaluating the focus which results from playback light traveling along the plural focal paths and for selecting a focal path, for use during playback, which improves the focus.

In one specific embodiment, the light-directing means comprises a beam-splitter means for directing light from the cells toward the common bit of data when the cells are also light sources. In this embodiment, this last named means directs a modulated light beam from the common bit of data toward the respective cells when the cells are detectors. Alternately, a single-plate combiner means is utilized in lieu of a beam-splitter means for this purpose.

In another application, the plural focal paths intersect different bits of data on the data record and the light-directing means is eliminated. These different bits may, for example, comprise successive bits on the same data row or bits on adjacent tracks of data on the data record. These successive bits and/or adjacent tracks of data may be recorded with data having different optical properties, for example, of different color or polarity, to minimize the interference of light traveling along one focal path with light traveling along other focal paths.

The plural cells may comprise the free ends of respective fibers of a fiber-optic cable having their opposite ends coupled to one or more light sources or detectors. The free ends of these fibers are separated and supported in a predetermined manner to establish the focal paths of different lengths. Also, the cells may be formed of plural bundles of fiber-optic fibers, the free ends of the fibers being supported so as to interleave the fibers from different bundles. Each bundle is adapted to transmit (in cases where the cells are sources), or receive (in cases where the cells are detectors) light of a different optical characteristic.

As another means of improving the focus of a digital optical data record, an apparatus is described for generating a line source of light which is used to create an elongated depth of focus on the data record. This apparatus includes a fiber-optic fiber having particles included therein for scattering light traveling along the fiber forwardly to form the the line source of light.

In a further form of the invention, the plural focal paths are provided by reflecting light within a glass plate having mirrored surfaces, with the length of the focal paths depending upon the number of reflections within the glass plate.

As a further means for improving the focus during playback of a data record, such a data record containing recorded data of extended depth is provided. In one such form, a data record having a thick photosensitive layer is recorded to provide data bits of extended depth. During playback, the playback light source need only focus on a location along the extended depth of the data rather than on a thin spot of data. Such a data record may be recorded in a conventional manner, or utilizing a plural cell embodiment discussed above in which the cells are light sources each associated with a focal path which intersects a common bit position on the data record. Thus, during recording, light is simultaneously transmitted along each of the focal paths to record a data bit of extended length. Also, the data of extended depth may be provided by overlaying plural, identical recorded data records, positioned such that when overlaid the data on each record is aligned with the data on the other records to provide a data record with data bits of extended depth.

As a result of this invention, manufacturing tolerances upon the scanner, the data record, and the means for holding the scanner and the record in accurate juxtaposition need not be as stringent, in comparison to the prior art, because focus correction is readily accomplished.

Furthermore, the record itself need not be perfectly flat, and may even be slightly warped, without causing blurring in the playback of information because of the improved focus resulting from the apparatus of this invention.

It is accordingly an object of the present invention to provide an improved method and apparatus for recording and reading out a digital optical data record having a high recording density.

It is another object of the present invention to provide an improved optically recorded data record of high recording density.

It is a further object of the present invention to provide an improved method of recording and reading out optical information which allows for less stringent tolerance requirements in the dimensioning and spacing of the apparatus and recording medium.

It is still another object of the present invention to provide an improved method of recording and reading out optically-recorded information wherein the flatness of the recording medium is not critical.

It is an overall object of the invention to provide a recording and playback system for a digital optical data record in which the focus of a playback light beam on the recording medium of the data record is improved.

It is a further object of the invention to provide an apparatus for recording data of extended depth upon a photosensitive layer of a digital optical data record.

It is another object of the invention to provide a digital optical data record having data bits of extended depth.

Still another object of the invention is to provide a digital optical record and playback apparatus in which plural focal paths are provided for recording and playing back the data record.

The subject matter which I regard as my invention is particularly pointed out and distinctly claimed in the concluding portion of this specification. The invention, however, both as to organization and method of operation, together with further advantages and objects thereof, may best be understood with reference to the following description taken in connection with the accompanying drawings, wherein like reference characters refer to like elements.

DESCRIPTION OF THE DRAWINGS

FIG. 5 is an enlarged view of a single-plate combiner form of light direction means;

FIG. 6A is a view of an embodiment of the invention utilizing a single cell and which includes a single-plate combiner to provide plural focal paths;

FIG. 6B is an additional view of the embodiment of the invention shown in FIG. 6A;

FIG. 7 illustrates an embodiment of the invention utilizing plural detectors and in which focal paths intersect successive bits of data on a single track of the data record;

FIG. 8 illustrates an embodiment of the invention utilizing plural light sources which transmit light of different optical characteristics, detector sensitive to such differing optical characteristics, and in which the focal paths intersect successive bits of data on a single track of the data record;

FIG. 9 illustrates a portion of an embodiment of the invention utilizing plural detectors and in which the focal paths intersect bits of data on adjacent tracks of data on the data record;

FIG. 10 illustrates a portion of an embodiment of the invention like that of FIG. 9, except in which the plural cells are light sources;

FIG. 11 illustrates cells formed from a bundle of optical fibers having their free ends separated and their opposite ends coupled to a single source or detector;

FIG. 12 illustrates cells formed from plural bundles of optical fibers having the free ends of fibers from the respective bundles interleaved, the opposite ends of the fibers of each bundle coupled to a respective source or detector, and with the sources or detectors having differing optical characteristics;

FIG. 15 illustrates a digital optical data record having a thick photosensitive layer which is recorded with data bits of extended depth;

FIG. 16A illustrates two identically recorded photosensitive layers of recording medium;

FIG. 16B illustrates a digital optical data record showing the two layers secured together in overlaying relationship to provide a digital optical data record with data bits of extended depth;

FIG. 17 is a block diagram of a circuit for selecting a playback focal path from plural focal paths containing detectors, the selected playback focal path providing the best focus on the data record;

DETAILED DESCRIPTION OF PREFERRED EMBODIMENTS

Figure 1:
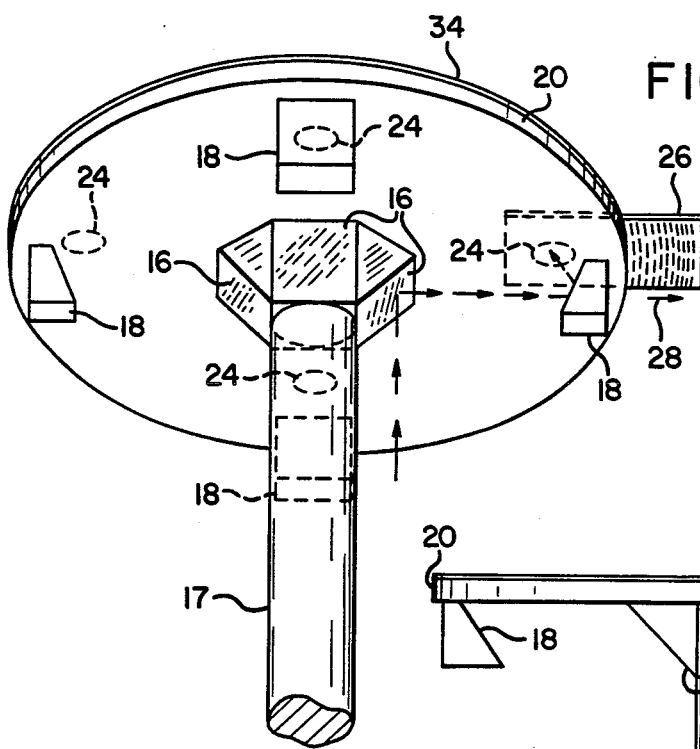
FIG. 1 is a perspective view, partially broken away, of a prior scanning apparatus employed for digital recording and playback of an optical data record.

Referring to FIG. 1, a conventional signal recording and playback system is shown. With such a system, a signal may be recorded as a plurality of digital "spots" with extremely high recording density. As described in the aforementioned U.S. Pat. No. 3,501,586, such a system operates to record a data record by first converting an analog signal to a digital signal utilizing analog to digital converter means. The resulting digital signal may be employed to modulate a laser light beam causing the transmission of an intermittent beam of light through a microscope objective and pinhole disc to one mirror of a series of forty-five degree angle mirrors 16 mounted on a rotating shaft 17 which supports a disc 20. The disc 20 is attached to the shaft 17 for rotation therewith. The intermittent beam is directed by the mirror 16 to a second mirror 18 mounted on the underside of disc 20 near its periphery. This second mirror 18 redirects the intermittent light beam through the suitably transparent disc 20. The disc includes a plurality of lens means 24 which receive the intermittent light beam from the second mirrors and directs the same onto a photographically sensitive record 26. As the light beam is modulated, the disc 20 is rotated and the record 26 is moved in the direction of arrow 28 whereby successive light beam paths intersect the record 26 causing photographic exposure thereof and recording of a plurality of very small "spots" in arcuate tracks indicative of the applied digital signal. Each mirror combination 16, 18 in turn intercepts the modulated laser beam of light so that each lens means 24 in turn catches the modulated light beam for directing the same upon the record 26.

To read out the recorded information from a developed data record, the same optical system may be employed with the addition of a photocell or other light detector (not shown in FIG. 1) positioned above the rotating disc 20. A playback light beam scans along the arcuate paths of digitally recorded information on record 26 and is modulated thereby. The photocell detects the modulated playback light beam and thus reads out the digital information. This digital information may then be converted into analog form as described in the aforementioned patent.

The manufacture and placement of lens means 24 for properly scanning the recorded information can be difficult since the recorded information is very closely packed and therefore alignment and focusing are critical. The depth of focus of a lens or lens system for producing very small spots and for reading out a digital recorded record is rather short, thus placing restrictions upon the flatness and allowable vertical movement of record 26, in the direction of arrow 32 in FIG. 2. To this point the apparatus as described is the same as disclosed in U.S. Pat. No. 3,501,586.

However, with reference to FIGS. 2 through 5, one embodiment of the invention for improving focus during playback of a digital optical data record is disclosed. In general this embodiment of the invention provides plural simultaneous focal paths of different lengths, each such path passing through a common bit of data and being provided for the travel of light during playback of the digital optical data record.

Figure 2:
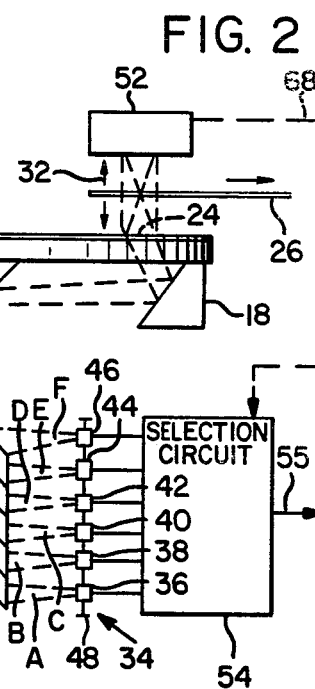
FIG. 2 is a side elevational view of the scanning apparatus of FIG. 1 including a focus correction apparatus with plural cells and focal paths in accordance with the invention.

As an overview, with reference to FIG. 2, an array 34 of plural cells 36, 38, 40, 42, 44 and 46 are provided with one such cell associated with each focal path as described below. These cells may either be light sources, such as for example, light emitting diodes, or optical detectors such as photocells. A support frame 48 is provided to support the cells in a predetermined manner to establish the length of the respective focal paths. Each such focal path extends from a respective cell, to a light directing means 50 which causes light traveling along each focal path to pass through the same data bit position on the data record, mirrors 16, 18, through a common bit of data on the data record and to an optical detector or light source means 52. Means 52 comprises a playback light source in the event the cells 36 through 46 are detectors and alternately comprises a detector means in the event the cells are light sources. Thus, the focal paths are of different lengths because the distance between the respective cells and lens 24 on the disc 20 is varied. That is, for example, the path from cell 36 to lens 24 is longest so that its associated focal path is the longest. Also, the path from cell 46 to lens 24 is shortest so that its associated focal path is shortest. Any number of such cells may be conveniently provided, although FIG. 2 illustrates a specific embodiment including six of such cells which define six focal paths. In addition, a selection circuit means 54 is provided to evaluate the focus resulting from playback light traveling along a particular focal path. This circuit selects one of the focal paths, the playback focal path, which results in improved focus. This selected playback focal path is used to play back the data record. The focus of the focal paths may be continuously evaluated, as explained below, so that when one playback focal path no longer provides a satisfactory focus, a shift is made to another focal path as the playback focal path. Thus, by "playback focal path", it is meant the focal path along which light is transmitted to read data from the data record.

Figure 4:
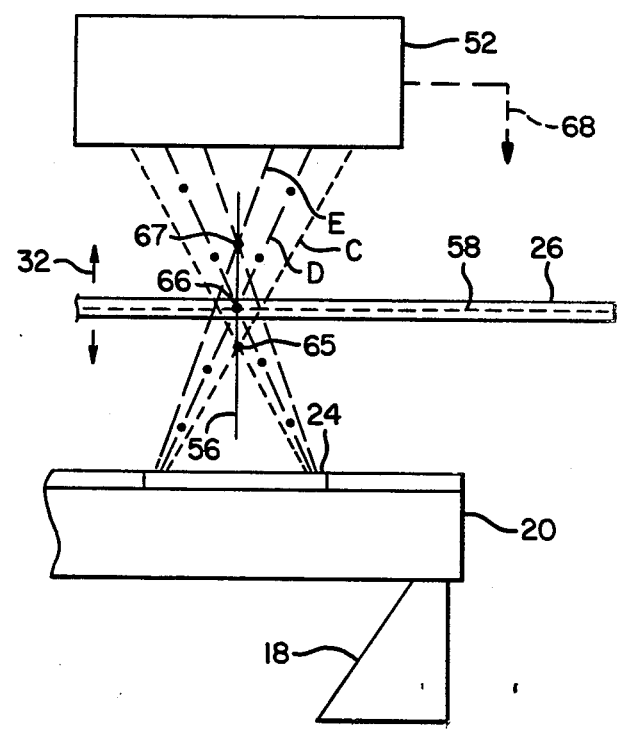
FIG. 4 is an enlarged view of a portion of the apparatus of FIG. 2, in which the cells are sources.

More specifically, with reference to FIGS. 2 and 4 the embodiment in which cells 36 through 46 each comprise a light source will be described. Light is directed from each of the cells toward the light directing means 50. This light directing means may comprise a conventional beam splitter which directs light from the respective cells in a common direction toward mirros 16 and 18 and hence toward a common bit position on the data record. That is, the cells are supported by support frame 48 and positioned relative to light directing means 50, such plural focal paths A, B, C, D, E and F of different lengths are provided. Light traveling along each of these focal paths is focused along a line 56 (FIG. 4) which is approximately normal to a data layer 58 of recorded data on record 26. For example, FIG. 4 illustrates light traveling along the focal paths C, D and E. These focal paths being of a length so as to respectively focus on points 65, 66 and 67. In this example, path D is focused on the layer of data 58. On the other hand, focal paths C and E are out of focus. It will be understood that, for illustrative purposes, the points 65, 66 and 67 have been illustrated spaced substantially apart. In actual practice, the focal paths focus on points very close together so that at least one such focal path will be focused on the data layer even though the layer of data fluctuates in the vertical direction 32. Such fluctuations are typically due to imprecise recording of the data layer 58, a somewhat warped data record 26, or by vibration of the record during playback.

In the embodiment of FIG. 4, the selection circuit 54 may be eliminated in certain applications. In such applications, light may be simultaneously directed along each of the focal paths. Only the light focused on the data record, i.e., light traveling along focal path D simultaneously, is effectively modulated by the data on the record. The light traveling along the other paths is typically not modulated to a significant extent and merely comprises a background or noise signal. Thus, the output signal at 68 from the detector means 52 corresponds to the signal received on focal path D and thus to the data on the data record. However, the light traveling along the other focal paths in some instances impairs the correspondence of the output signal at 68 to the recorded data.

For this reason, it is frequently preferable to employ a selection circuit 54. Such a selection circuit can take a number of forms and will be explained in more detail below. However, in general, selection circuit 54 may comprise a means for turning or cycling light source cells 36 through 46 on and off individually for receiving the resulting output signal at 68 from detector 52 and for evaluating this received output signal to determine if it has been modulated by data on the data record. By cycling through the respective cells one at a time, interference from adjacent cells is minimized. Furthermore, selection circuit 54 is capable of determining the cell and associated focal path which produces the best focus on the data. Alternately, the cell and focal path which results in a focus at least equal to a threshold or minimum desired focus can be determined. Furthermore, areas of dummy or focus test data can be recorded on the data record in a conventional manner. The selection circuit may thus be operable to detect such areas of dummy or focus test data and evaluate the focus of the focal paths during time periods of dummy or focus test data. A playback focal path is thus selected during the dummy data time periods and used for playing back data from the data record after the period of recorded dummy or focus test data ends. Therefore, the non-dummmy or non-test data recorded on the data record is not lost during focus correction because focus correction takes place during the time test data is being played back from the data record. Selection circuit 54 produces an output signal at 55 which corresponds to the light traveling along the focal path of improved focus and thus to the data on the data record. The details of these and other suitable selection circuitry are described below.

Figure 3:
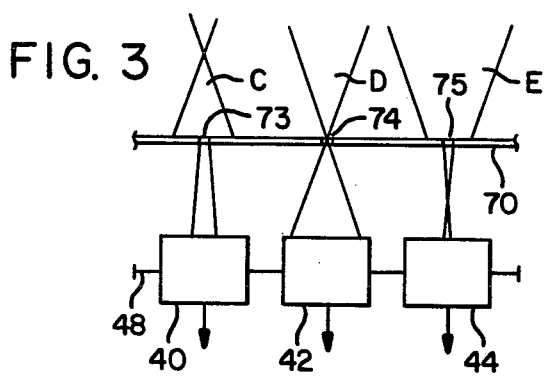
FIG. 3 is an enlarged view of a portion of the apparatus of FIG. 2 in which the cells are detectors and in which an apertured mask has been added.

With reference to FIGS. 2 and 3, the embodiment in which cells 36 through 46 are detectors will be described. In this case, means 52 comprises a playback light source which illuminates a portion of the data record. As can be seen from FIG. 3, typically an apertured mask 70 is interposed between the light direction means 50 and the detectors to minimize interference of light traveling along one focal path with light traveling along the other focal paths. Also, as can be seen from FIG. 3, which illustrates playback light traveling along focal paths C, D and E, only focal path D is of the proper length to be in focus on the data layer 58 of the data record. As a result, the detector 42 associated with this focal path receives a substantial amount of light through its associated aperture 74 in mask 70. This light has been modulated by the data on the data record and thus cell 42 produces an output signal corresponding to the recorded data. In contrast, light traveling along focal paths C and E is not in focus and thereby very little light passes through apertures 73, 75 to the cells 40, 44. Consequently, the detectors 40, 44 do not produce an output signal of the magnitude of the output signal from the in-focus detector 42.

The selection circuit 54 in this latter example receives the detector output signals and evaluates such signals to determine which detector is associated with the focal path which is in focus. The output 55 of the selection circuit corresponds to the output of the detector having the best focus and thus corresponds to the data on the data record.

Again, it should be noted that the differing lengths of the focal paths C, D and E in FIG. 3 have been exaggerated for illustrative purposes. In practice, these focal paths are closer to the same length so that one of such focal paths is focused on the data layer at virtually all times.

It should also be noted that the apparatus of FIG. 2 is suitable for recording data of extended depth on the data record. That is, each of the cells 36 through 46 comprise a light source including a laser and means for modulating the laser to transmit an intermittent beam of light through a microscope objective and pinhole operative to the light directing means 50. The resulting recorded signal comprises a vertical stack of spots along the line 56 (i.e., FIG. 4) in the photosensitive material of the digital optical data record. Hence, because the recorded data has an extended depth, focusing of a playback source on the data record is facilitated. That is, because of the extended depth, a portion of the recorded data bit will be within the effective focal distance of the objective lens 24 even though the record vibrates or moves in the direction of arrow 32 in FIG. 4

An alternate form of light direction means is shown in FIG. 5 and comprises a single plate combiner means. In the illustrated form, such means comprises a glass plate 80 having a first surface 82 coated with a material that makes this first surface approximately ninety percent reflective. The second surface 84 of plate 80 is coated with a material which makes this second surface approximately one hundred percent reflective. Surfaces 82, 84 are parallel to one another. Furthermore, plate 80 is oriented such that the angle $\alpha$ between the plane containing surface 82 and the plane containing the optical sensitive surfaces of detectors 36 through 46 is approximately forty-five degrees. An opening 86 is provided in the coating of surface 84 to enable a light beam 88, modulated by data on the data record, to pass through surface 84 and enter the plate 80. Beam 88 travels along a path generally perpendicular to the plane containing the surface of the detectors. A portion of the modulated light beam 88 passes through surface 82 along focal path A and through an opening 71 in mask 70 toward detector 36. Another portion of the light beam 88 is reflected off surface 82 toward surface 84 and then directed toward surface 82. Upon reaching surface 82 the beam is again divided with a portion passing along focal path B and through mask opening 72 toward detector 38 and another portion passing toward surface 84. This latter portion of beam 88 is directed toward surface 82. At surface 82 the beam is again divided with a portion passing along focal path C through opening 73 toward detector 40 and another portion directed toward surface 84. In a like manner, the light beam is divided with portions transmitted along focal paths D, E and F through mask openings 74, 75 and 76 to the detectors 42, 44 and 46. Thus, the beam 88 which passes through a common data bit position on data record travels along plural simultaneous focal paths, the length of the focal paths being determined by the number of reflections within the single plate combiner means prior to reaching a detector. Although FIG. 5 illustrates the arrangement with cells 36 through 46 being photo detectors, the single plate combiner works equally well with the cells 36 through 46 being light sources and apertured mask 70 removed. In this latter case, light travels in the opposite direction along the focal paths from the cells toward the data record and detector. Thus, the beam splitter of FIG. 2 and single plate combiner of FIG. 5 are exemplary of forms of light directing means 50 for directing light from plural cells along different focal paths to a common bit position of the data record. Of course, other forms of light directing means will be apparent to those having skill in the art.

FIGS. 7 and 8 illustrate the invention in which support frame 48 supports cells 36 through 44 to provide associated focal paths A through E oriented to pass through different bit positions on the same track of data on the data record. More specifically, the cells are oriented such that focal paths A through E pass through successive bit positions on a track of data on the data record. Because, the focal paths are not directed through a common bit position of the data record, light directing means 50 is eliminated.

In FIG. 7, cells 36 through 44 comprise respective optical detectors and a light transmission means 52 is provided as a playback light source to illuminate a section of the data record. Selection circuit 54 evaluates the output of these detectors and selects as the playback focal path a focal path containing a detector which improves the focus on the data record. In a manner explained in detail below, to prevent discontinuity in readout of the recorded data, shifts from one focal path to another are preferably accomplished during a time period when dummy data is being read from the data record. Such dummy data is recorded on the record in a conventional manner for the purpose of facilitating focus using this apparatus. Selection circuit 54 determines when dummy data is being read from the data record and shifts from one focal path to another, as necessary to improve the focus, during the time period of dummy data so that non-dummy information is not lost.

In FIG. 8, the cells 36 through 44 comprise respective light sources for transmitting playback light along associated focal paths A through E. However, in FIG. 8, light of different optical characteristics is transmitted along adjacent focal paths. Furthermore, means 52 comprises an optical detector having respective detector portions 52a, 52b sensitive to the differing characteristics of the transmitted light. For example, color filters 90, 94, 96, 98 and 100 may be disposed in the respective focal paths A through E between the cells 36 through 44 and mirrors 16. Filters 90, 96 and 100 may be of one color, while filters 94 and 98 may be of another. Furthermore, detector portion 52a is sensitive to light of the one color, while detector portion 52b is sensitive to light of the other color. Because light traveling along adjacent focal paths is hence of a different color, interference is minimized.

For example, assume focal path C is the focal path which is in focus. Thus, light of the first color from filter 96 is effectively modulated by the data on the data record, detected by detector portion 52a, with an output from this detector portion being transmitted to selection circuit 54. In contrast, light traveling along focal paths B and D are of a different color. Hence, incidental light traveling along these paths and impinging on detector portion 52a do not interfere with the signal produced by this latter detector portion. Thus, even though light traveling along path B and D may be modulated to a limited extent by data on the data record, interference with the light traveling along focal path C is minimized because of the color difference in the light transmitted. Interference from light of the first color transmitted along focal paths A and E is minimal because such paths are even further out of focus than paths B and D and thereby have little impact on the modulated light signals detected by detector portion 52a, which travels along focal path C. Of course, filters 90 through 100 can each be of a different color, with associated detector portions sensitive to each color incorporated into light detector 52. Other optical characteristics can alternately be utilized. For example, polarity filters can be utilized instead of color filters so that light traveling along the adjacent focal path is of a different polarity. In operation, the effect is much the same as if color differences are utilized.

FIGS. 9 and 10 illustrate the invention in which frame 48 supports the cells 36 through 44 to provide focal paths A through E of different lengths, each passing through a different track of data on the data record. More specifically, frame 48 supports these cells so as to provide focal paths through data bits on successive tracks of data. During playback of the data record, a playback focal path is selected which provides an improved focus. Preferably, the shifting from one playback focal path to another, as necessary to improve the focus, is accomplished during dummy data areas of the data record so that non-dummy data is not lost during shifting. In FIG. 9, the cells comprise detectors, with light traveling along focal path C and detected by detector 40 being in focus on the associated data track. In contrast, in FIG. 10, the cells comprise light sources, with source 40, which directs light along focal path C, being in focus on the data record.

FIGS. 11 and 12 illustrate respective cells 36 through 44 which comprise the free ends of fiber optic fibers. In FIG. 11, the opposite ends of these fibers are coupled to a common light source or detector 102. That is, in the case in which cells 36 through 44 comprise light sources, a light source 102 is provided for transmission of light through the fiber optic fibers to the free ends thereof. In contrast, when the cells are optical detectors, a common detector 102 is provided for receiving light transmitted along the respective fibers.

As a more specific example, in FIG. 11 light traveling along focal path C is in focus on the data record and hence the free end of the optical fiber comprising cell 40 receives modulated light. This fiber carries the received modulated light to detectors 102. However, the light passing along the remaining focal paths is not in focus on the data record. Thus, the light traveling along such focal paths and detected by the free ends of the fibers comprising cells 36, 38, 42 and 44 is not significantly modulated. As a result, light directed by such fibers to detector 102 does not cause a significant fluctuation in the output of detector 102. Hence changes in the level of the output of detector 102 corresponds to changes in the level of light traveling along focal path C, with minimal interference from light traveling along the other focal paths, and thereby corresponds to the data on the data record.

In FIG. 12, plural bundles of fiber optics fibers 104, 106 are provided with the free ends of the fibers of each bundle being interleaved. Thus, alternating cells 36, 40 and 44 are defined by the free ends of fibers from bundle 104 while cells 38 and 42 are defined by the free ends of fibers associated with bundle 106. A common detector or light source 108 is provided at the opposite ends of the fibers forming bundle 104 and a similar source or detector 110 is provided for bundle 106.

In applications in which cells 36 through 44 are light detectors, because of the interleaving of the free ends of the optical fibers, interference is minimized. That is, if for example, focal path C is in focus, light traveling along this focal path will be modulated by the data on the data record. This modulated data is detected by the free end of the fiber defining cell 40 and is fed to detector 108. This produces an output corresponding to the received modulated light and hence to the recorded data. Light traveling along adjacent focal paths B and D may be somewhat modulated by the data, although not to the extent of light traveling along focal path C because focal paths B and D are not in as clear a focus. However, this latter light does not affect the output of detector 108 as it is fed to detector 110. Furthermore, because light traveling along focal paths A and E are even further out of focus than light traveling along paths B and D, the impact of this light on the signal produced by the detector 108 is minimal.

Also, in situations in which the free ends of the fibers or cells 36 through 44 are light sources, light of differing optical characteristics may be transmitted to these sources to minimize interference, as previously described in connection with FIG. 8. For example, a color filter 112 of a first color may be associated with light source 108 and a color filter 114 of a second color may be associated with light source 110. Thus, adjacent cells 36 through 44 will transmit light of a different optical characteristic, namely, different color. Alternately, filters 112 and 114 can be polarity filters such that light of differing polarities is transmitted by the adjacent cells.

FIGS. 6A and 6B illustrate another embodiment of the invention in which plural simultaneous focus paths are provided, in this case by a light focal path adjustment. Such means may comprise a mirror means 119 including a transparent plate 120, such as of glass, a first surface 122 coated with a material making this first surface approximately one hundred percent reflective, and a second surface 124 coated with a material making this second surface approximately ninety percent reflective. A light transmitting means, not shown, directs light generally in the direction of arrow 126 toward the second surface 124 of mirror means 119. A portion of light reaching surface 124 enters the mirror 119 and is reflected therein until it exits from a pinhole aperture 128 toward an optical detector 130. The number of reflections within mirror means 119 prior to exiting from pinhole aperture 128 determines the length of the focal path.

In FIG. 6A, light beam 126, which comprises a converging beam of light having been modulated by data on an optical digital data record, reflects from surface 122 to surface 124 twice before exiting from pinhole aperture 128 to detector 130. In FIG. 6B, the light beam 126 reflects only once from surface 122 to surface 124 prior to exiting from the aperture 128. Thus, the focal path illustrated in FIG. 6A is longer than the focal path illustrated in FIG. 6B and the lengths of the focal paths is related to the number of reflections of light between the surfaces 122, 124 prior to exiting from the mirror means 119. Furthermore, these focal paths exist simultaneously. As a more detailed explanation, as can be seen from FIG. 6A, a portion of the converging beam of modulated light 126 entering the mirror means 119 travels on a first focal path directly from the first surface 124 to the pinhole aperture and through the aperture to the light detector 130. In contrast a second portion of the light beam travels on a second focal path by being reflected from the first surface 122 toward the second surface 124 and back toward the first surface 122 with another portion thereof exiting through the pinhole aperture. Additional portions of the light beam are reflected between the surfaces additional times such that differing portions of the light beam follow different focal paths of length determined by the number of reflections of the beam prior to exiting through the aperture 128. One of these focal paths converges the beam on the pinhole aperture and is in focus on the data record.

Figure 13:
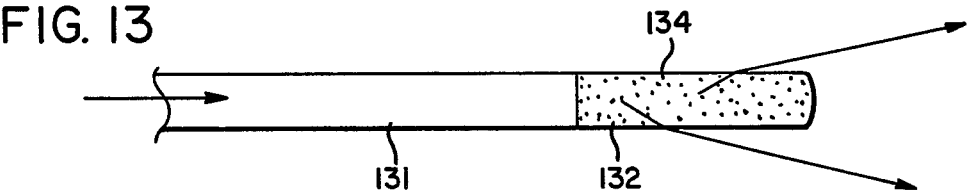
FIG. 13 illustrates an apparatus for providing a line source of light.

FIG. 13 illustrates an apparatus for producing an elongated line source of light. This apparatus comprises a fiber optic fiber having a main light transmission portion 131 which carries light from a light source and a forward light scattering portion 132 which converts light traveling along fiber portion 131 into a line of light.

Portion 132 is formed with particles 134 embedded therein for forwardly scattering the light traveling along the main fiber portion 131. These particles are preferably nonlight absorbing and sized to give maximum forward scatter of the light beam. If the particles are much smaller than a wavelength of the light traveling in the fiber, significant scattering does not result. It has been determined that the diameter of suitable particles is approximately expressed by the formula:

$$D = \left( \frac{\lambda}{2\pi(M-1)} \right)$$

In this formula, D is the diameter of the particles, (M−1) is the difference in index of refraction between the particles and the fiber in which the particles are embedded, and λ is the wavelength of light traveling along the fiber. As a specific example, if the light source were an HE-NE laser, λ would be 0.633 microns. Then, if (m−1) is 0.1, D would be approximately 1 micron. This would provide a front to back scattering ratio of roughly 60. Taking this further, particles of a diameter ranging from approximately 0.5 to 1.5 microns with an index of refraction of about 1.57 to 1.60 would be suitable. This is a typical range for optical glasses of both the crown and flint types. The fiber material might be methyl methacrylate which has an index of refraction of 1.49. Thus, the term (M−1) would then be 0.08 to 0.11 depending on the glass involved. The scattering tip would be manufactured by mixing the glass beads into the monomer while it is being polymerized and then formed into a fiber in conventional manner. The scattering tip 132 is attached, as by transparent adhesive, to the end of the main light conducting fiber 131. Furthermore, in connection with manufacturing of the line source of light, assume that the object to image ratio for the objective lens 24 is, for example, five. Also assume that a focus elongation of 3 mils (0.003 inches) was desired at the data layer. Then, the scattering section would be $(0.003)(5)^2 = 0.075$ inches long. The density of the particles would be adjusted so that each ray of light traveling along the fiber would preferably hit at least one particle but not more than about five particles. Of course, in a straightforward manner as well known to those skilled in the art, adjustment in the manufacture of such a scattering tip 132 can be made.

Figure 14:
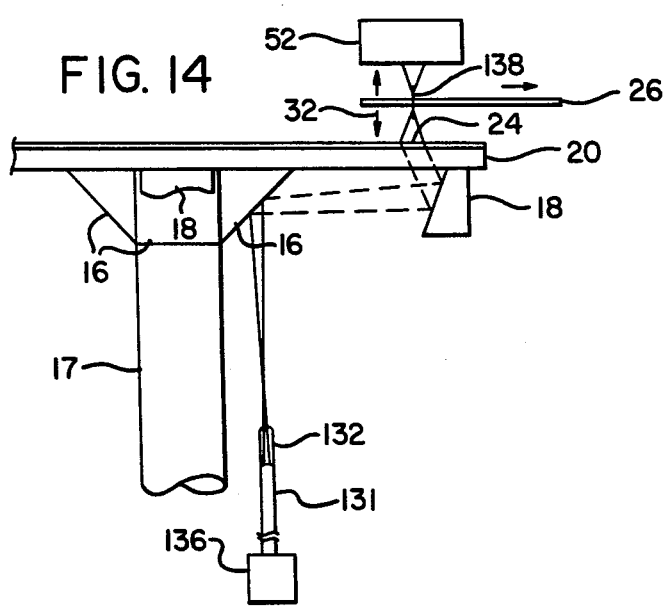
FIG. 14 illustrates a digital optical playback apparatus utilizing the apparatus of FIG. 13.

The use of such a line source of light in playing back a digital optical data record is illustrated in connection with FIG. 14. Light from a laser or other source 136 is transmitted through main fiber 131, scattered forwardly by tip 132 and reflected by mirrors 16, 18 through objective lens 24 and the data record 26 to a light detector 52. With this light source, the beam of light 138 in the region of data record 26 approximates a line, exaggerated in FIG. 14. Because a line source of light appears in the region of the data record, the light is focused on data over an extended depth so that the light remains in focus even though the data shifts in a direction indicated by arrows 32. As mentioned above, such movement may be caused by movement of the record or imperfections in recording of data on the record.

This again illustrates a means in accordance with the invention for improving the focus of a digital optical data record.

FIGS. 15, 16A and 16B illustrate still another means in accordance with the invention for improving the focus of a digital optical record during playback.

In connection with FIG. 15, a digital optical data record 26 is illustrated having a substrate 140 supporting a photosensitive medium or layer 142. However, unlike prior art data records, the photosensitive layer 142 is made of extended thickness or depth so that when data are recorded thereon, data bits are lengthened in a direction normal to the plane of the record. Consequently, the focus of the apparatus during playback is enhanced. Thus, the playback light beam will be focused on a portion of the data at virtually all times. More specifically, as the data record vibrates or moves in a direction normal to the plane of the record, the playback light source is nevertheless focused on the data bit as such vibrations merely bring a different portion of the recorded data bit into focus.

In the prior art known to applicant, data layers of from one to fifteen microns thick have been utilized. However, it has been discovered that a data thickness of approximately 0.03 inches or 75 microns improves the focus on the data record during playback. Heretofore, no one known to applicant has recognized that such an extended data thickness is suitable. Apparently because one would expect during playback, that interference from adjacent extended data bits on the data bit being played back would cause an impaired, rather than enhanced, focus. Thus, the term "thick photosensitive layer" is intended to encompass a thickness much greater than utilized in the prior art, as for example approximately 75 microns.

In FIGS. 16A and 16B, a data record is illustrated comprising multiple layers of recorded data, in this case two, 148, 150, laminated together and secured in a conventional manner to a substrate 146. However, each of the layers 148, 150 have portions of identical data recorded thereon and are positioned in overlaying relationship such that corresponding bits of identical data are in alignment. Thus, during playback of the data record focusing is improved because the overlaid identical data is of extended depth. This enhances the focus in much the same manner as the data record of FIG. 15 having a thick photosensitive layer.

FIG. 17 illustrates a selection circuit for use in applications in which the cells are detectors and in which the selection circuit selects as the playback focal path, the focal path resulting in the best focus. Such a selection circuit is particularly suitable for use in connection with the embodiment of the invention illustrated in FIG. 2 in which the focal paths pass through a common bit of data on the data record. In general, the circuit of FIG. 17 continuously monitors each of of the focal paths and automatically shifts to the focal path which provides the best focus.

In greater detail, FIG. 17 illustrates detectors 36 through 46. Also, an additional detector 150 is shown in dashed lines to illustrate the ease at which additional detectors can be added to the apparatus to provide additional focal paths, as desired. Typically, detectors 36 through 46 and 150 comprise photocells which produce an output signal having an amplitude corresponding to the magnitude of detected light. Thus, when a detector receives a modulated light beam, the output of that detector fluctuates in a manner corresponding to the data which modulated the beam of light. In this circuit, the outputs of detectors 36 through 46 and 150 are fed to the non-inverting inputs of respective differential amplifiers 154 through 166. In addition, the output of detector 36 is fed to the inverting input of an additional differential amplifier 152, which in turn has its non-inverting input coupled to a negative, direct-current voltage supply 168. The outputs of detectors 38 through 46 and 150 are connected to the inverting inputs of respective differential amplifiers 154 through 164. In addition, the inverting input of differential amplifier 166 is coupled to a positive direct-current voltage source. Also, the outputs of differential amplifiers 154 through 166 are fed to respective first inputs of respective two input AND gates 170 through 182 which in turn each have their outputs connected to an OR gate 184. OR gate 184 produces an output comprising the output 55 of the selection circuit 54. Also, the output differential amplifier 152 is coupled through an inverter 186 to the second input of AND gate 170. Furthermore, the outputs of amplifiers 154 through 164 are coupled through respective inverters 188 through 198 to the second inputs of respective AND gates 170 through 182.

When connected in this manner, the circuit of FIG. 17 operates as follows to select a playback focal path resulting in improved focus. Assume that detector 40 and its associated focal path C provides the best focus on the digital output data record. Hence, the output of detector 40 will be modulated by the data on the data record and have an output of a higher amplitude than the outputs of the other detectors. Consequently, during playback, the output of differential amplifier 158 will be positive or a logic one. At the same time, the output of amplifier 156 will be a logic zero because the signal at its inverting input is greater than the signal at its non-inverting input. This logic zero is inverted by inverter 190 and appears as a logic one at the second input to AND gate 174. Thus, the inputs to AND gate 174 associated with detector 40 and focal path C are both positive so that the output of gate 174 is a logic one. Correspondingly, the output of OR gate 184 is a one as is the output at 55 of the selection circuit. As the light detected by detector 40 fluctuates due to modulation of the data, the output of detector 40 also fluctuates. This causes a corresponding fluctuation in the output of gates 174, 184 and at the output 55 of the selection circuit. Hence, the output of the selection circuit corresponds to the light traveling along focal path C and hence to the data on the digital optical data record.

Also, since focal path C is the playback focal path resulting in the best focus, paths A and B, associated with detectors 36, 38, are progressively more out of focus. Hence, differential amplifiers 152, 154 produce logic zero output signals and disable gates 170, 172. Likewise, focal paths D, E, F, etc. are also progressively more out of focus, resulting in logic zero outputs from amplifiers 160, 162, 164. Thus, gates 176 through 180 are disabled. Furthermore, the amplitude of the signal from detector 150 to the non-inverting input of amplifier 166 is less than the amplitude of the signal fed to the inverting input of this amplifier. As a result, the output of amplifier 166 as a logic zero so that gate 182 is disabled. Thus, only the gate 174 associated with detector 40 produces an output signal corresponding to the modulated data. The outputs of the remaining detectors are effectively blocked from OR gate 184 and hence are ignored. Incidentally, the voltage fed to the inverting input of amplifier 166 is typically set at a magnitude corresponding to a minimum acceptable level of focus so that amplifier 166 only produces a logic one output signal when the output of detector 150 is at least equal to this minimum acceptable focus.

Thus, as explained above, the selection circuit of FIG. 17 comprises a means for selecting the focal path which improves the focus of the apparatus during playback of the data record.

Figure 18:
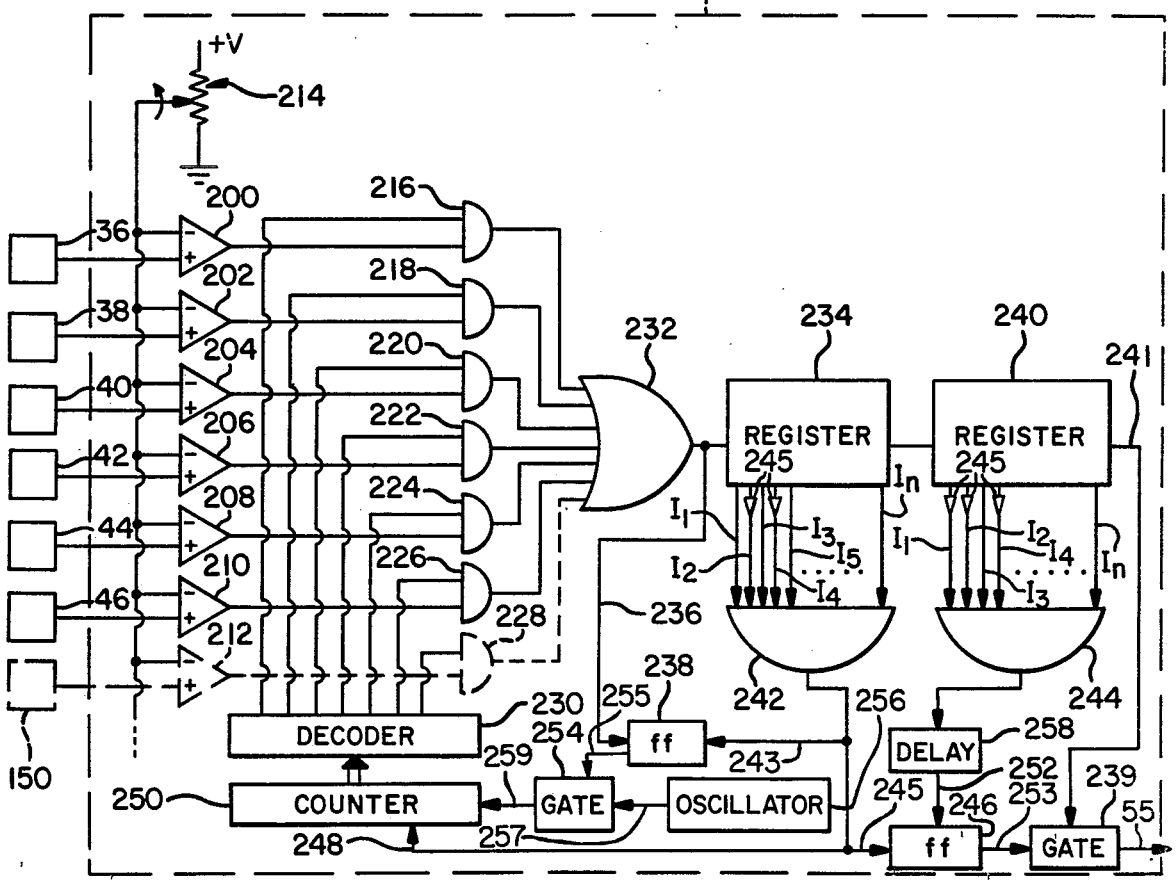
FIG. 18 is a block diagram of a circuit for selecting a playback focal path from plural focal paths containing detectors, the selected focal path providing a focus which is at least equal to a threshold or minimum focus.

The selection circuit of FIG. 18 comprises a means for selecting, as the playback focal path, a focal path which provides a focus at least equal to a threshold or minimum acceptable level of focus. More specifically, the circuit of FIG. 18 is designed to evaluate the focus of the focal paths during periods in which dummy data is being read from the data record.

As true of the FIG. 17 circuit, FIG. 18 shows detectors 36 through 46 together with an additional detector 150, shown to demonstrate the ease at which the circuit can be expanded to accommodate additional focal paths and detectors.

More specifically, the output of the detectors 36 through 46 and 150 are fed to the non-inverting inputs of respective differential amplifiers 200 through 212. The inverting input of each of these differential amplifiers is coupled to a variable voltage source 214, which establishes a threshold or minimum acceptable level of focus. That is, amplifiers 200 through 212 produce a logic zero output signal unless the amplitude of the output of at least one of the detectors is greater than the amplitude of the voltage established by voltage supply 214. The outputs of amplifiers 200 through 212 are fed to respective first inputs of two input AND gates 216 through 228. The second input of each of these AND gates is coupled to respective outputs of a conventional decoder circuit 230 for purposes explained below. An OR gate 232 receives the outputs of AND gates 216 through 228 and has its output coupled both to the input of a first conventional shift register 234 and also to the reset input 236 of a flip-flop 238. Shift register 234 has its output coupled to a second conventional shift register 240, which in turn is coupled to a data receiving input 241 of an on-off gate 239. The output of gate 239 comprises the output 55 of the selection circuit 54.

Shift register 234 comprises an N-bit shift register with an output associated with each bit position which coupled to a respective input $I_1, I_2, I_3 \ldots I_N$ of an N-input AND gate 242. Likewise, shift register 240 comprises an N-bit shift register having an output associated with each bit position which is coupled to respective inputs $I_1, I_2, I_3 \ldots I_N$ N-input AND gate 244. Inverters such as 245, are interposed in certain of the lines coupling the shift registers 234, 240 to the respective AND gates 242, 244. These inverters establish a code word for each shift register so that AND gates 242, 244 produce a logic one output only when it's associated shift register detects the code. More specifically, when each bit position of the shift register 234 is occupied by data which results in a positive, logic one, input at each input of AND gate 242, then the AND gate produces a logic one output signal. Likewise, only when each bit position of shift register 240 is occupied by data that results in a positive, logic one, input at each input to AND gate 244, this latter AND gate produces a logic one output signal.

The code word detected by shift register 234 is encoded on the data record at the time the record is recorded and is positioned at the start of a period of dummy data. The code word detected by shift register 240 is recorded on the data record at the end of the period of dummy data.

The output of AND gate 242 is coupled to an enable input 243 of flip-flop 238, to an enable input 245 of a flip-flop 246, and to a reset input 248 of a counter 250. The output of AND gate 244 is coupled to the reset input 252 of flip-flop 246. The output of this latter flip-flop is coupled to the gating input 253 of on-off gate 242. Also, the output 255 of flip-flop 238 is coupled to the gating input of on-off gate 254. Gate 254 has a signal receiving input 257 coupled to the output of an oscillator 256 and an output coupled to an input 259 of counter 250. The output of counter 250 is coupled in parallel to decoder 230.

Assume that during operation of the circuit, detector 40 is receiving an output signal greater than the signal established by threshold voltage circuit 214 and that decoder 230 is producing a positive output to AND gate 220. Under these conditions, the output of AND gate 220 will go between logic one and logic zero state, corresponding to fluctuations in the modulated light beam detected by the detector 40, and thus corresponding to data on the digital optical data record. These signals pass through OR gate 232 and are shifted through registers 234, 240 and gate 239, which is on, and appear at the output 55 of selection circuit 54.

However, when the data in shift register 234 matches the start of dummy data code word, AND gate 242, the focus of the apparatus is tested. At this time, AND gate 242 produces a logic one output signal which resets counter 250 to zero, causes flip-flop 238 to change states and produce a logic one signal to gate 254 turning on this latter gate, and causes flip-flop 246 to change states and produce a logic zero output signal turning off gate 239. Consequently, the output 55 of the selection circuit 54 ends. In fact, as explained below, the output ceases for the duration of the time that dummy data is being read from the digital optical data record. As a result, the dummy data is eliminated during playback of the optical data record.

With gate 254 on, the signal from oscillator 256 is fed to counter 250, which counts the cycles or pulses from the oscillator. Upon the first pulse, decoder 230 transmits a logic one output signal to AND gate 216 and logic zero outputs to the remaining AND gates 218 through 228. Thus, these latter AND gates are off. Assuming that the output from detector 36 is of an amplitude less than the amplitude of the voltage established by circuit 214, the output of differential amplifier 200 will be a logic zero. As a result gate 216 is off and the circuit continues in the same state. Upon the next pulse from oscillator 256 to counter 250, decoder 230 produces a logic one output to AND gate 218 and a zero output to the remaining AND gates. Thus, these remaining AND gates are off.

If the amplitude of the signal detected by detector 38 is greater than the amplitude of the signal established by voltage circuit 214, then differential amplifier 202 provides a logic one output signal to AND gate 218. Hence, since the AND gate inputs are both positive, a logic one signal appears at the output of OR gate 232. This latter signal resets flip-flop 238 which in turn causes gate 254 to turn off. This blocks transmission of the oscillator signal to counter 250. As a result, decoder 230 remains with a positive signal only on the output leading to AND gate 218 because the focal path containing detector 38 has been selected as the playback focal path.

Gate 239 remains off until such time as the data in shift register 240 corresponds to the end of dummy data code word, at which time ANd gate 254 produces a logic one output signal. This latter signal in turn resets flip-flop 246 so that gate 239 turns on. This enables data to pass from shift register 240 through gate 242 and through the output 55 of the selection circuit.

Therefore, as playback of the digital optical data record continues, the output at 55 corresponds to the optically recorded data in circuit 202. In addition, the focal path containing detector 38 remains the selected focal path until such time as the next recorded dummy data is reached and the focal paths are again evaluated.

Incidentally, a time delay circuit 258 may be interposed between AND gate 244 and flip-flop 246 to delay the resetting of flip-flop 246 a sufficient time to enable the shifting of the end of dummy data code word out of shift register 240 prior to turning on gate 239. In such a case, the end of dummy data code word is removed from the data stream at output 55.

Figure 19:
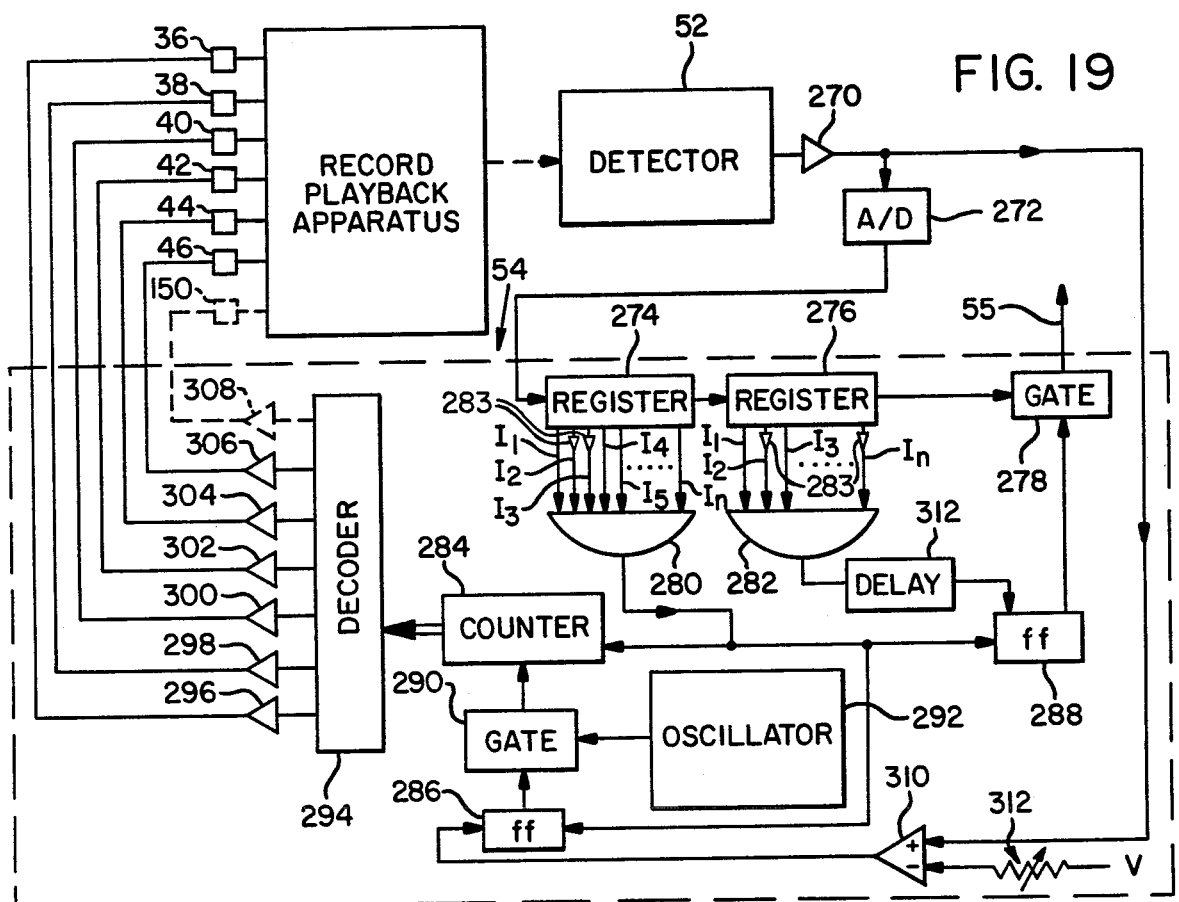
FIG. 19 is a block diagram of a circuit for selecting a playback focal path from plural focal paths containing light sources, the selected focal path providing a focus which is at least equal to a threshold or minimum focus.

The selection circuit of FIG. 19 is designed to evaluate the focus of the various focal paths when the cells 36 through 46, and the additional cell 150 are light sources. Again, cell 150 is illustrated to demonstrate the ease at which additional cells and focal paths can be included in the apparatus. Also, like the circuit of FIG. 18, the circuit of FIG. 19 is designed to evaluate the focus of light traveling along the focal paths during a time period when dummy data is played back from the digital optical data reord. Furthermore, the circuit of FIG. 19 selects, as the playback focal path, a focal path containing the cell which provides a threshold or minimum acceptable focus on the data record. More specifically, the circuit evaluates the focus by turning the light sources 36 through 46 and 150 on one at a time, comparing the amplitude of the output voltage signal from a detector 52 with the amplitude of a threshold voltage signal, and selecting a focal path containing a light source or cell which results in an output from detector 52 of an amplitude at least equal to the amplitude of the threshold voltage and thus corresponding to a minimum acceptable level of focus.

More specifically, cells 36 through 46 and 150 direct light toward a data record as previously explained.

Also, the data record is supported by a record playback apparatus and detector receiving light from the cells which has passed through the data record. Equivalently, the light may be reflected from the record instead of passing through it.

Assume that non-dummy data is being played back from the record and that cell 40 is contained in the playback focal path. In this case, the remaining cells 36, 38, 42, 44, 46 and 150 are off. Light from cell 40 is modulated by the data on the data record, detected by detector 52, amplified by an amplifier 270 and fed to a converter 272 which converts the analog data signal from detector 52 into binary levels. This binary data is shifted through an N-bit start of dummy data word detecting shift register 274, and an N-bit end of dummy data word detecting shift register 276, through a gate 278, which is on, and to the output 55 of the selection circuit 54. The stream of data appearing at output 55 is utilized in a conventional manner to reconstruct the signal recorded on the data record.

A repetitive output of shift register 274 is associated with each bit position of the register. These outputs are coupled to respective inputs $I_1, I_2, I_3 \ldots I_N$ of an N-input AND gate 280. Also, a respective output of the shift register 276 is associated with each bit position of the register. These outputs are coupled to respective inputs $I_1, I_2, I_3 \ldots I_N$ of another N-input AND gate 282. Inverters, such as 283, placed at selected inputs of the AND gates 280, 282 establish respective start of dummy data and end of dummy data code words. That is, as explained in connection with FIG. 18, upon the start of a period of dummy data recorded on the data record, all of the inputs to AND gate 280 will be at a logic one, causing this gate to produce a logic one output signal. Likewise, at the end of a period of recorded dummy data all of the inputs to gate 282 will be at a logic one causing this gate to produce a logic one output signal.

The output of AND gate 280 is coupled to a counter 284, a first flip-flop 286, and a second flip-flop 288. The output of flip-flop 288 is coupled to the gating input of gate 278 and causes this latter gate to be on under the conditions previously described. In contrast, upon the start of a period of dummy data, the logic one output from AND gate 280 cause flip-flop 288 to change states and turn off gate 278. Hence, data is not transmitted from the selection circuit at output 55 upon the start of a dummy data period. In addition, this positive output at AND gate 280 resets counter 284 to zero and causes flip-flop 286, which has an output coupled to the gating input of a gate 290, to turn previously non-conducting gate 290 on. Oscillator 292 generates a signal which passes through the conducting gate 290 to counter 284 which counts the oscillator pulses or cycles. A decoder 294 receives the output from counter 284, in parallel, and has plural outputs each coupled through a respective amplifier driver 296 through 308 to the light sources cells 36 through 46 and 150.

Upon the first cycle from the oscillator, following the start of the dummy data period, counter 284 and decoder 294 turn cell 36 on while the remaining cells are off. Thus, detector 52 detects light traveling along the focal path associated with cell 36. This detected signal is fed through amplifier 270 to the non-inverting input of a differential amplifier 310 which has its inverting input coupled to a variable voltage source 312. Assuming that the output of detector 52 is not of an amplitude at least equal to the voltage established by voltage source 312, then the output from differential amplifier 310 is a logic zero. Furthermore, the output is coupled from differential amplifier 310 to the reset input of flip-flop 286. Because this output is a logic zero, flip-flop 286 remains in its previous state and gate 290 remains conducting. Upon the next oscillator cycle, the counter and decoder combination turn on light source 38 while the remaining cells are off. Again, an amplitude comparison is made by differential amplifier 310. Assuming that the focal path associated with light source 38 does not result in a focus at least equal to the threshold established by voltage circuit 312, the output of differential amplifier 310 remains a zero and the evaluation of the focal paths continues. Assume that this process has continued until light source 44 is turned on with the remaining cells off. At this time, also assume that detector 52 detects a signal of an amplitude greater than the amplitude of the voltage established by threshold circuit 312. In such a case, the output of differential amplifier 310 is a logic one, which causes flip-flop 286 to reset and in turn shuts off gate 290. Counter 284 and decoder 294 thus remain in their same state with light source 44 on. The selection circuit remains in this state until an end of dummy data word is detected by shift register 276. At this time, AND gate 282 produces a logic one output. Following a time-delay established by a time-delay circuit 312, of a sufficient length of time to allow the end of dummy data code word to shift through register 276, the logic one signal from AND gate 282 reaches the reset input of flip-flop 288. This causes flip-flop 288 to turn on gate 278 so that data again passes through the gate and appears at the output 55 of the selection circuit.

In this manner, the selection circuit of FIG. 19 selects a focal path associated with a light source which provides a minimum desired level of focus. Furthermore, once a focal path is selected, data is read from the record until the next start of dummy data word is detected, at which time evaluation of the focus provided by the focal paths again takes place. Incidentally, the dummy data time period, as in the case of FIG. 18, is of sufficient length to enable each of the focal paths to be evaluated starting with the focal paths associated with the first cell 36. Of course, other sequences of evaluation can also be utilized.

Figure 20:
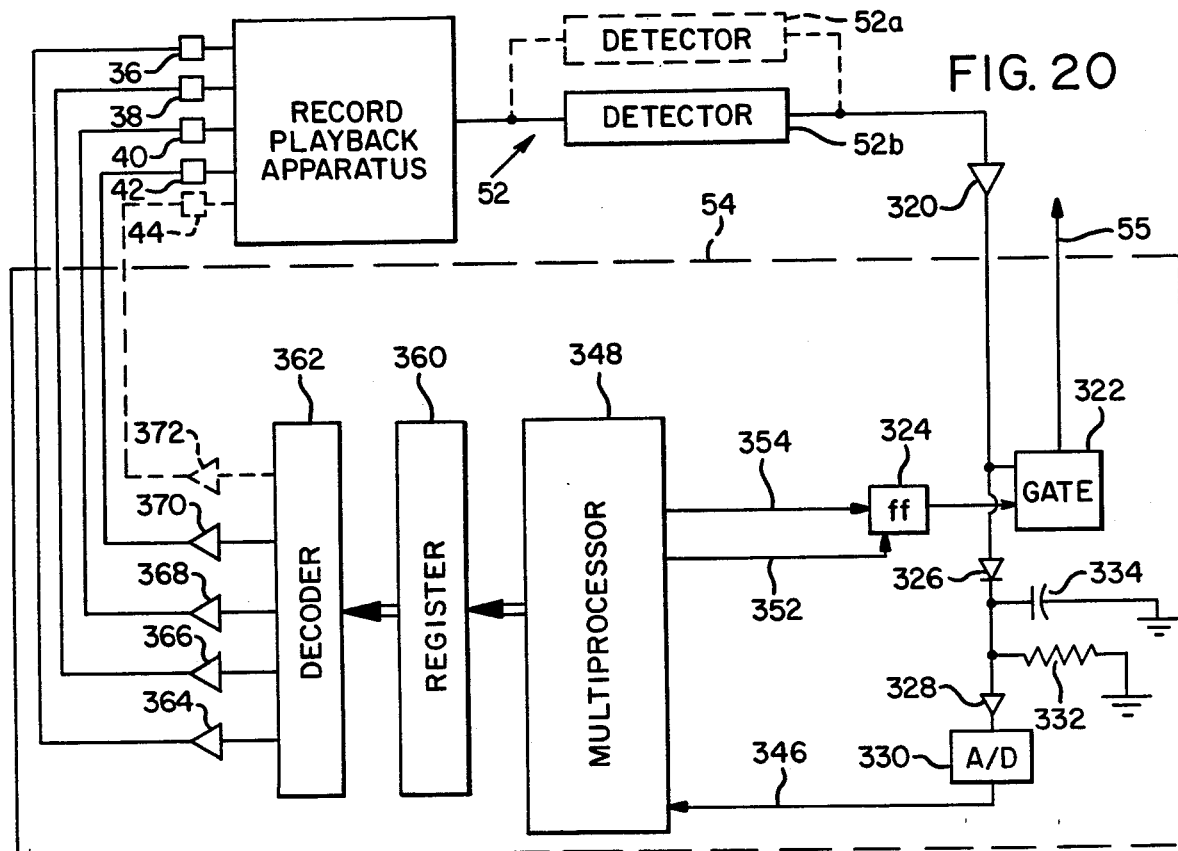
FIG. 20 is a block diagram of a circuit for selecting a playback focal path from plural focal paths containing light sources, the selected focal path providing the best focus on the data record.

Another form of selection circuit is illustrated in FIG. 20. The circuit of FIG. 20 utilizes a programmed multiprocessor to evaluate the focus provided by plural light sources 36 through 44 and associated focal paths. The light sources are utilized to play back a digital optical data record supported by a record playback apparatus. Cell 44 is illustrated in dashed lines to indicate the ease of adding additional cells, if desired.

Light from cells 36 through 44 passes through the digital optical data record and is detected by a light detector 52, which may comprise detector portions 52A and 52B sensitive to light of differing optical characteristics as previously explained. Typically, during playback of the record, only one of the sources (for example, light source 40) is on while the remaining sources are off. Light from this source is modulated by the data on the record and is detected by detector 52. This detector produces an output signal having an amplitude corresponding to the modulated light which it receives. The detector output signal is amplified by an amplifier 320 and fed through a conducting gate 322 to the output 55 of the selection circuit 54. A flip-flop 324 coupled to gate 322 transmits a control signal to this gate, causing it to be on in this situation. The detector output signal is also passed through a diode 326, an amplifier 328 and to an input of an analog to digital converter 330. A resistor capacitor network comprising a resistor 332 and capacitor 334 connected in parallel between the cathode of diode 326 and ground is provided to average the peak signals in the data stream. Thus, the data is shaped into a form more suitable for processing by the analog to digital circuit 330. The digitized signal from circuit 330 is fed to a data input 346 of a multi-processor 348.

The multi-processor may be programmed in accordance with the flow chart of FIG. 21, as explained more fully below, for evaluating the focus of light traveling along the focal paths. In general, in accordance with this flow chart, until the data received at input 346 indicates a start of recorded dummy data on the data record, gate 322 remains conducting. In contrast, at the start of such a dummy data period, a signal is transmitted on line 352 to flip-flop 324 which causes the flip-flop to change states and turn off gate 322. Consequently, data does not appear at output 55 of the selection circuit after the dummy data begins. Upon completion of the recorded dummy data, multi-processor 348 detects an end of dummy data code word and sends a reset signal on a line 354 to flip-flop 324. This again causes gate 322 to conduct and allow the passage of data from detector 52, through gate 322 and to the output of the circuit at 55.

During dummy data periods, a signal is transmitted from multi-processor 348 to a buffer register 360 which in turn is coupled to a decoder 362. Decoder 362 has plural outputs, each of which is coupled through a respective driver amplifier 364 through 372 to a respective cell 36 through 44. This register 360 and decoder 362 operate in the same manner explained above as counter 284 and decoder 294 to selectively activate one cell at a time to enable individual evaluation of the focue of the focal path associated with the cell which is on. Multi-processor 348 monitors the data received at its input 346 from each of such cells when they are on, and determines which cell is associated with a focal path providing an improved focus. This latter focal path is then selected as a playback focal path.

Figure 21:
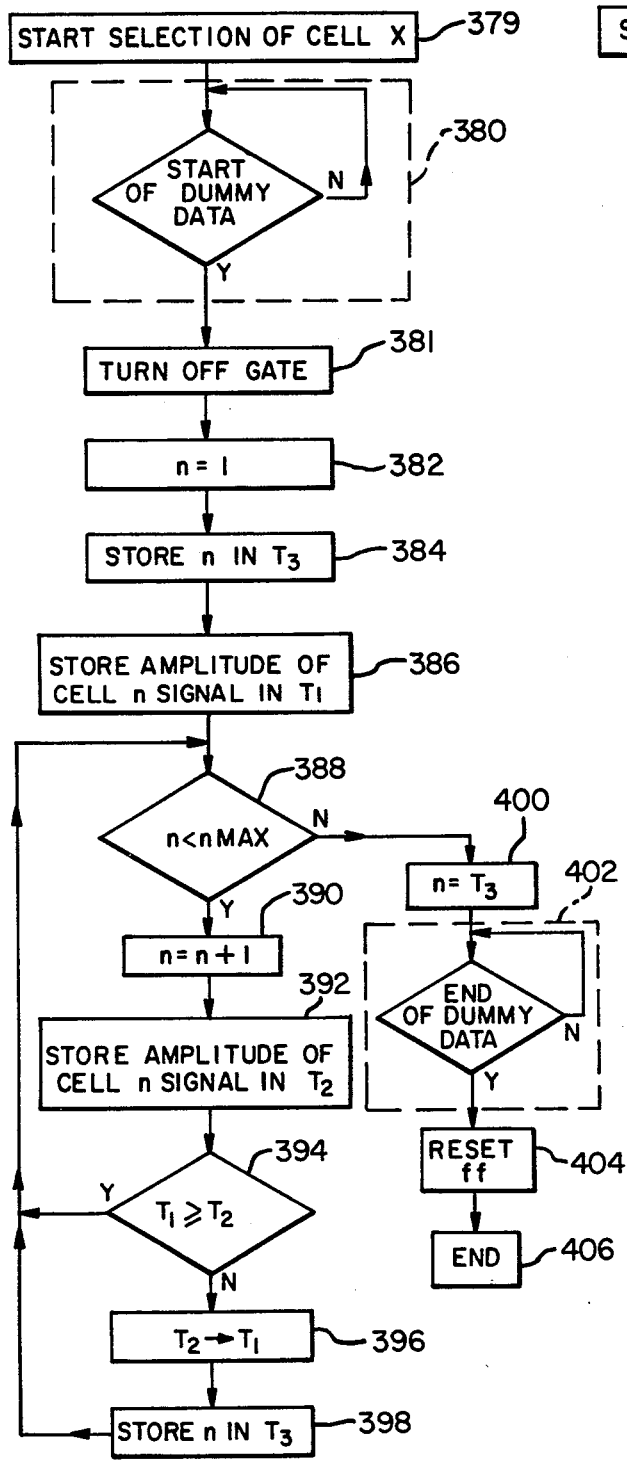
FIG. 21 illustrates a flow chart for the circuit of FIG. 20.

More specifically, when programmed in accordance with the flow chart of FIG. 21, the process is initially started at a block 379 and a decision block 380 is reached. At decision block 380, the multi-processor evaluates the data arriving at an input 346 and determines whether or not the cell which is on is playing back the start of a period of recorded dummy data. If this not the case, the apparatus remains at decision block 380 until the start of dummy data is indicated. Thereafter, the gate 322 is turned off, as indicated by block 381, thereby shutting off the passage of dummy data to the output 55 of the selection circuit. Of course, the gate 322 need not be turned off as the dummy data can be eliminated elsewhere in the apparatus.

For convenience, the number of cells are designated by the symbol n, and initially n is set equal to one at block 382, corresponding to the first cell and first focal path being evaluated. The value of n is stored in memory $T_3$, as indicated by block 384, and the amplitude of the signal detected when cell n is on is stored in a memory $T_2$, pursuant to block 386. A decision block 388 is then reached. At block 388 it is determined whether or not n is equal to the maximum number of cells in the apparatus. Since there is more than one cell present, the initial answer at decision block 388 is "yes." Hence, block 390 is reached and n is set equal to n+1, or at this time n=2. This second cell is turned on and the amplitude of the signal detected with the second cell on is received by the multi-processor at input 346 and stored in a memory $T_2$. A decision block 394 is then reached in which it is determined whether or not the amplitude stored in $T_1$ is greater or equal to the amplitude stored in $T_2$. In other words, whether or not the focus of the focal path associated with the n=1 cell is greater than or equal to the focus of the focal path associated with the n=2 cell. If the answer is "no," then the focus of focal path associated with the second cell is better than the focus of the focal path associated with the first cell. In this case, the value of the amplitude stored in $T_1$ is replaced by the value stored in $T_2$ and the new value of n (n=2) is stored in $T_3$. These steps are indicated by blocks 396 and 398. From block 398 the flow chart returns to decision block 388 with the focus of the focal paths associated with additional cells being evaluated.

Assume the n=3 cell, the third cell tested, is associated with the focal path having the best focus. Then, when decision block 394 is reached, its "yes" branch is followed and blocks 396 and 398 are bypassed. The flow chart returns to decision block 388. The process would continue in this manner until such time as the focal path associated with the last cell had been tested. At such time, the "no" branch is followed from block 388 to block 400 at which time n is set equal to the value of n stored in $T_3$, in this case n=3, which corresponds to the cell and focal path having the best focus as determined by the multi-processor. From block 400, a decision block 402 is reached which asks if the end of the dummy data has been reached. If not, the processor remains at block 402 until the dummy data ends. A block 404 is reached and flip-flop 324 is reset to turn on gate 322 and again transmit the data stream from the detector 52 to the output 55 of the selection circuit. The selection process then ends at block 406 until such time as the dummy data is again detected and the process restarts at blocks 379, 380.

In this manner, the flow chart of FIG. 21 operates to select the focal path containing the cell which produces an improved focus. As indicated by the dashed lines in FIG. 21, decision blocks 380, 402 may be eliminated, in which case the focal paths are evaluated continuously as the record is played back.

Figure 22:
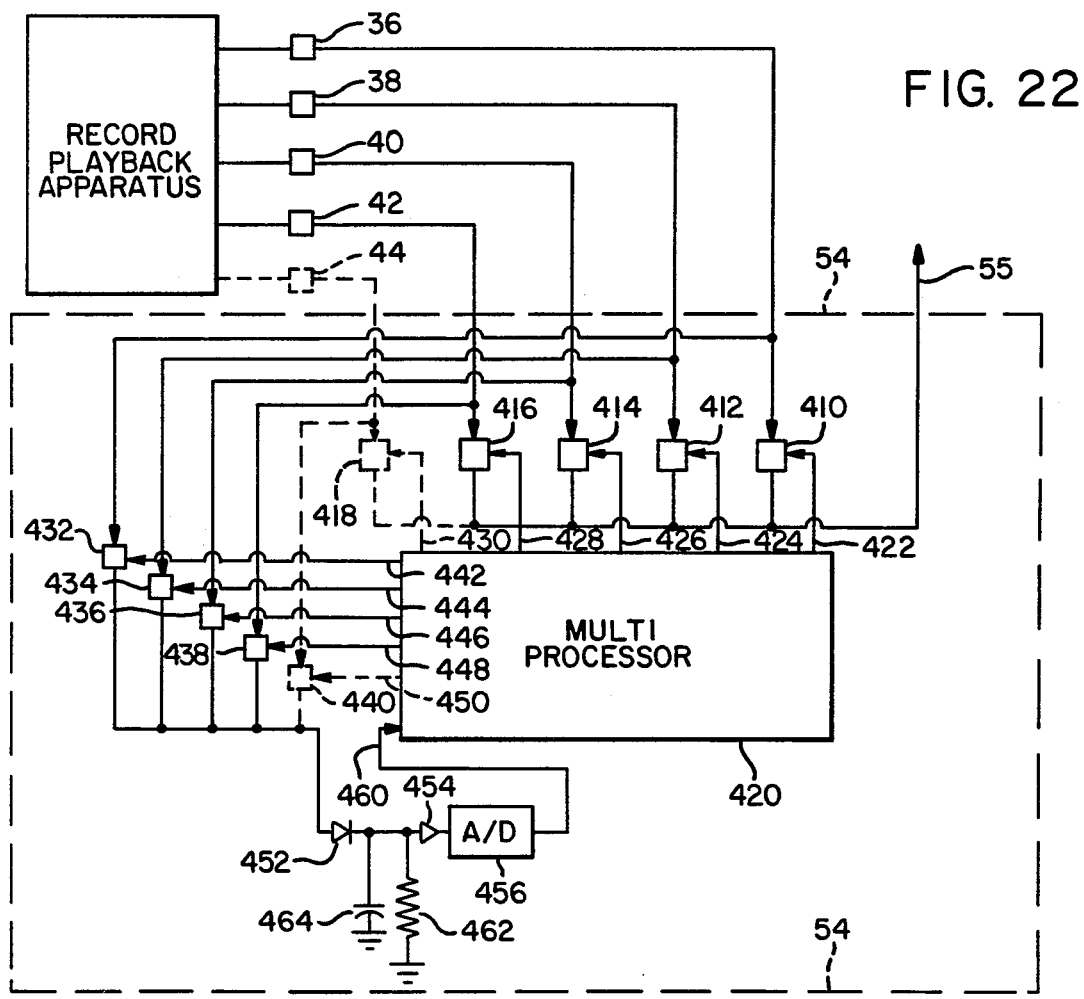
FIG. 22 is a block diagram of a circuit for selecting a playback focal path from plural focal paths containing detectors, the selected playback focal path providing the best focus on the data record.

Still another form of selection circuit 54 is illustrated in FIG. 22 in which cells 36 through 44 are illustrated and in which these cells comprise optical detectors. Cell 44 is shown in dashed lines to indicate how additional cells may be added as desired.

Light passing through, or equivalently reflected from, the record supported by the record playback apparatus impinges on the cells. The outputs of these cells fed to respective on-off gates 410 through 418 controlled by a multi-processor 420. More specifically, multi-processor 420 produces respective gate control signals at output 422 through 430 to control respective gates 410 through 418. The outputs of these latter gates are coupled to output 55 of the selection circuit. Typically, only one of such gates is conducting at a time, for example, gate 414. Under such circumstances, the light detected by detector 40 produces an output signal corresponding to the optical data on the data record, which is transmitted through gate 414 to the output 55 of the selection circuit. In addition, the outputs of detectors 36 through 44 are also fed to inputs of respective on-off gates 432 through 440. Gates 432 through 440 are also controlled by gate control signals on respective lines 422 through 450 from the multi-processor 420. In the circumstances in which gate 414 is conducting, gate 436 is also conducting so that the output of detector 40 is fed through gate 436, a diode 452 and amplifier 454, and an analog to digital converter 456 and to a data input 460 of the multi-processor 420. An averaging circuit comprising a resistor 462 and capacitor 464 connected in parallel and coupled between the cathode of diode 452 and ground is provided for averaging the peaks in the signal from detector 40 to facilitate processing by converter circuit 456. Multi-processor 420 may be programmed in accordance with the flow chart of FIG. 23 to accomplish evaluation of the focus provided by the focal paths.

Figure 23:
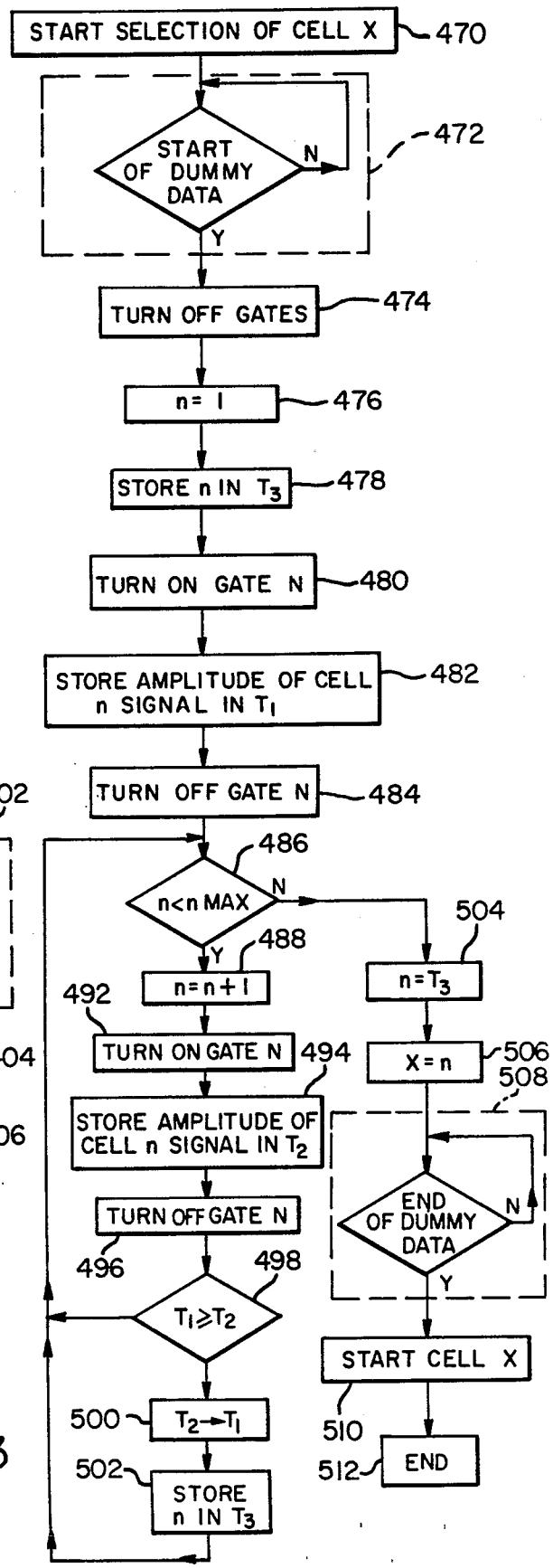
FIG. 23 illustrates a flow chart for the circuit of FIG. 22.

With reference to FIG. 23, the focal path selection process starts at block 470, from which a decision block 472 is reached. While at block 472, multi-processor 420 evaluates the data received at its input 460 and determines when recorded dummy data commences. Until such time, the circuit remains at block 472, with gates 414 and 436 (FIG. 22) being on so that data is fed to the output 55 of selection circuit 54. At block 474 (FIG. 23), gates 410 through 418 are turned off, thereby shutting off the stream of data at output 55 during the time dummy data is read from the record.

At block 476, n is set equal to one corresponding to the first cell (such as cell 36 of FIG. 22) and associated focal path. The value of n is stored in a memory $T_3$ as indicated by block 478. Also, in block 480, the nth gate leading from the detectors to the multi-processor, in this case gate 432 associated with cell 36, is turned on. Multi-processor 420 then stores the amplitude of the signal detected by cell 36 in a memory $T_1$, as indicated by block 482. Thereafter, gate 432 is turned off as shown by block 484. Decision block 486 is thereupon reached and a determination is made as to whether or not the cell in question is the last cell to be tested. Since in the example n=1, initially the answer is "yes", block 488 is reach, and the cell n is incremented to n+1 or 2. This corresponds to cell 38 in FIG. 22.

The multi-processor then turns on the gate associated with the nth cell, in this case gate 434, as indicated by block 492. The amplitude of the signal detected by cell 38 is then stored in a memory section $T_2$ of the multi-processor, pursuant to block 494. Thereafter, the nth gate, in this case gate 434, is turned off at block 496. Following block 496, a decision block 498 is reached at which time it is determined whether or not the amplitude stored in memory $T_1$ is greater th n or equal to the amplitude stored in memory $T_2$. If "yes,", this indicates that the focal path containing the cell (in this case cell 36) which produced the value stored in $T_1$ is at least focused as well as the focal path containing the cell (in this case cell 38) associated with the amplitude stored in memory $T_2$. Furthermore, the flow chart returns to decision block 486 for testing the focus provided by additional cells and associated focal paths. On the other hand, if the answer at decision block 498 is "no", the amplitude stored in memory $T_1$ is replaced by the amplitude of the signal stored in memory $T_2$, as indicated by block 500. In such a case, the cell (cell 38) supplying the signal stored in $T_2$ is associated with a focal path providing inproved focus. Following block 500, at block 502, the new value of n (n=2) corresponding to the cell 38 in this instance is stored in memory $T_3$. Additional cells are tested in the same manner until eventually at decision block 486 n is greater than or equal to the maximum number of cells, and block 504 is reached. At block 504, n is set equal to the value of n stored in memory $T_3$ as this corresponds to the cell associated with the focal path providing the best focus. At block 506, the focal path containing this cell is selected and a decision block 508 is reached. The system remains at decision block 508 until the end of the recorded dummy data is detected, at which time block 510 is reached and the gates associated with the selected focal paths are turned on by the multi-processor. For example, assuming the focal path including detector 38 had the best focus, then at block 510 gates 412 and 434 (FIG. 22) are turned on so that data again passes out from selection circuit 54 at output 55. Selection of the appropriate focal path then ends, as indicated by block 512 until such time as the next start of dummy data period is reached as determined at block 472 when the cycle is repeated.

Blocks 472 and 508 are shown in dashed lines as they are removed in situations in which dummy data has not been recorded on the data record. In such cases, the flow chart of FIG. 23 operates to continuously monitor the detector outputs and shift from focal paths containing one detector output to a focal path containing another detector when the latter detector results in an improved focus.

Figure 24:
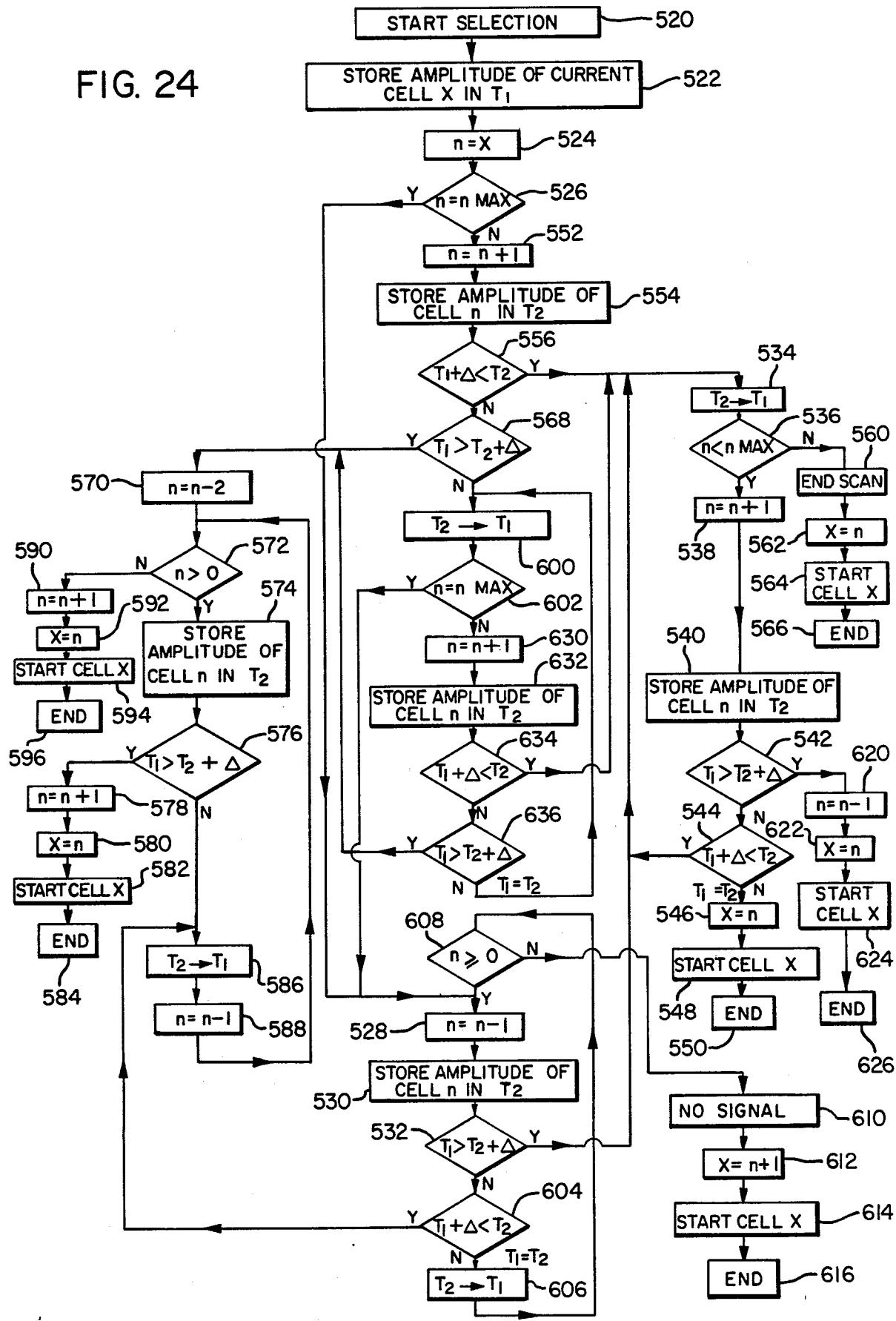
FIG. 24 illustrates an alternate flow chart for circuit of FIG. 20.

As another example, the multi-processors of FIGS. 20 and 22 can be programmed in accordance with the flow chart of FIG. 24 for selection of a focal path which improves the focus of the apparatus. Unlike the flow charts of FIGS. 21 and 23, the flow chart of FIG. 24 does not automatically start the selection process with the first call. Instead, selection commences by checking the focus of the focal path containing the cell in use immediately prior to the commencement of selection. For example, if the n=3 cell was in use immediately prior to the selection process, then the selection process starts with the n=3 cell. Because deviations in focus tend to occur rather gradually, the focus correction is accomplished more rapidly by this flow chart. That is, if there is a deviation in focus, the cell contained in the focal path providing the best focus is likely to be one of the two cells adjacent to the n=3 cell. By starting with the n=3 cell, the selection proceeds to focal paths containing the adjacent cells first, thereby eliminating testing focal paths further removed from those that are in focus.

More specifically, with reference to FIG. 24, selection of the focal path which provides an improved focus initially starts at block 520. This optionally may involve a detection of a start of dummy data period in the manner of flow charts of FIGS. 21 and 23. From block 520, a block 522 is received and the amplitude of the light detected from the cell and focal path in use prior to the selection process is stored in a memory $T_1$ of the multi-processor. At block 524, the variable n is set equal to x, with x corresponding to the cell in use immediately prior to selection.

For purposes of explanation, assume there are four cells and the cell in use immediately prior to selection is the fourth (x=4) cell. Then, the "yes" branch is followed to a decision block 526, at which time it is determied whether or not n is equal to the maximum number of cells in the apparatus. Such a "yes" indicates that n cannot be incrementd further in a positive direction. Hence, a block 528 is reached and n is set equal to n−1 (or in this case n=3). The amplitude of the signal detected when the n=3 cell is in use is then stored in a memory $T_2$ pursuant to block 530. Thereafter, a decision block 532 is reached at which point it is determined whether or not the amplitude stored in memory $T_1$ is greater than the amplitude stored in memory $T_2$ plus a small differential value. If the answer is "yes", this indicates that the cell corresponding to the maximum value of n (n=4) is associated with a focal path which provides a better focus than the cell adjacent to it (the n=3 cell) and block 534 is reached. At block 534, the amplitude signal stored in memory $T_1$ is replaced with the amplitude signal stored in memory $T_2$. Decision block 536 is then reached, at which point it is determined whether or not n is less than the maximum number of cells. In view of block 528, at this point the answer is "yes" so that a block 538 is reached and n is incremented by 1. Next, at block 540, the amplitude of the detectd signal with the nth cell on, in this case the n=4 cell, is stored in memory $T_2$. At decision block 542, it is determined whether or not the signal $T_1$ is greater than the signal stored in $T_2$ plus delta, wherein delta is a small difference signal. In this case, in accordance with the discussion above, the answer is "no" as $T_1$ is equal to $T_2$, having both been derived from the output resulting when the n=4 cell was used. Thus, a decision block 544 is reached at which point it is determined whether or not $T_1$ plus delta is less than $T_2$. Again, because they are equal, the answer is "no" and block 546 is reached. Furthermore, the focal path containing the nth cell, in this case the last cell, is selected at block 546. This cell is started at block 48 and the focal path selection is completed as indicated by block 550, until selection again is started at block 520.

Continuing the description, assume that when decision block 526 was reached, the next to last cell (x=3) was the one in use at the time selection started. Hence, the "no" branch is followed from block 526 to a block 528 and n is incremented by one. Hence n is now equal to four, in the example, which corresponds to the last cell. The amplitude of the signal detected when the focal path containing the n=4 cell is used is then stored in memory T in accordance with block 554 and a decision block 556 is reached. Assume that the last cell is associated with a focal path providing an improved focus, then the "yes" branch is followed from block 556 to block 534, at which time the signal stored in $T_1$ is replaced by the signal stored in $T_2$. Next, at decision block 536, because n is now equal to four and the maximum number of cells, the "no" branch is followed from this block to a block 560 and scanning for purposes of selection of a playback focal path ends. That is, at this point it has been determined that the focal path associated with the last cell is of improved focus compared to the focal path associated with the next to last cell. Because of the positioning of such cells, the focal path containing the second from last cell would be still further out of focus and the focal path containing the furthest from the last cell would be still more out of focus. Thus, there is no need to continue the selection process. Hence, at block 562 the selected cell x is set equal to n (x=4 in the example) and at block 564 the focal path containing this cell is selected as the playback focal path, with such cell being energized. Selection ends at block 566 until the selection is again started at block 520.

Next returning to decision block 556, for the situation under discussion in which we started with the x=3 cell and incremented n at block 552 to n=4. Assume further that the answer at block 556 is "no", which means that the n=3 cell is associated with a focal path of better focus than the focal path associated with the n=4 cell. Under these conditions, a decision block 568 is reached, at which time it is determined if the amplitude signal stored in $T_1$ is greater than the amplitude signal stored in $T_2$ plus a difference signal. Assuming at this block that the answer is "yes", a block 570 is reached. This indicates that the focus of the focal path containing the third cell is improved over the focus of the focal path containing the fourth cell by at least the difference signal. At block 570, n is set equal to n−2, corresponding to the second cell as the focal path associated with the second cell is the next to be evaluated.

Next, at a decision block 572, it is determined whether or not n is greater than zero. In the example under discussion, n=2 so the "yes" branch is followed from block 572 to a block 574. At this latter block, the amplitude of the detected light traveling along the focal path containing the second cell is stored in memory $T_2$. Thereafter, at block 576, it is determined whether or not the amplitude signal stored in $T_1$ is greater than the amplitude signal stored in memory $T_2$ plus the difference signal delta. If "yes", this indicates the third cell is associated with a focal path having a better focus than the focal path containing the second cell. In this case, a block 578 is reached at which point n is incremented by 1 to n=3. At block 580, the cell corresponding to n=3, the third cell, is selected. At block 582, the focal path associated with this third cell is selected as the playback focal path and playback commences. At block 584, the selection process is terminated until such time as it restarts at block 520.

Assuming in the discussion immediately above that at block 576 the answer was "no". This indicates the focus of the focal path associated with the second cell was better than the focus of the focal path associated with the third cell. In this instance, block 586 is reached and the amplitude of the signal stored in $T_1$, corresponding to the signal detected from the focal path associated with the third cell, is replaced with the amplitude signal stored in memory $T_2$, corresponding to the signal detected during playback along the focal path containing the second cell. Next, at block 588, n is set equal to n−1, in this case n is now equal to one and the selection process returns to block 572. At block 572, comparison is made of the focus of the focal path containing this first cell with the focal path containing the second cell, which was previously determined to be the best thus far. At block 572, the answer is "yes" and the amplitude of the detected signal associated with the focal path containing the first cell is then stored in memory $T_2$, pursuant to block 574. At block 576, a comparison is made with the "yes" branch being followed to block 578 as previously discussed if it is determined that the signal stored in memory $T_1$ is greater than the signal stored in memory $T_2$ plus a difference signal. If the answer happens to be "yes", this indicates that the focal path associated with the second cell results in a better focus than the focal path associated with the first cell. In contrast, if the answer at block 576 is "no", then the focal path associated with the first cell is of an improved focus in comparison with the focal path containing the second cell. In such a case, blocks 586 and 588 are reached and the process returns to block 572. However, at block 572, the "no" branch is followed to block 590 as all of the cells and focal paths have not been tested. Consequently, at block 590 n is incremented by one to a value of one. Also, the selected cell is determined to be the first cell at block 592. Furthermore, at block 594, the focal path containing this selected cell is selected as the playback focal path. In addition, the selection process ends at block 596, until it again starts at block 520.

Continuing the example, assume at block 568 instead of determining that the focal path containing the third cell was of poorer focus than the focal path containing the fourth cell. In other words, that the amplitude signal stored in $T_1$ was not greater than the amplitude signal stored in $T_2$ plus the difference signal. Thus, the "no" branch from block 568 is followed to a block 600 and the amplitude signal stored in memory $T_1$ is replaced by the amplitude signal stored in memory $T_2$. At decision block 602, since in the example n is now equal to four, the "yes" branch from this block is followed to block 528 and the process continues as previously described in connection with blocks 528, 530 and 532. However, at block 532, the answer this time is "no" so that block 604 is reached. At block 604, in view of the determinations made at blocks 556 and 568, the answer would be "no" and a block 606 is reached. This indicates that the amplitude signal stored in $T_1$ is equal to the amplitude signal stored in $T_2$. Thereafter, the signal stored in $T_1$ is replaced by the signal stored in $T_2$ and a decision block 608 is reached. At block 608, it is determined whether or not n is greater than zero. If n is not greater than zero, then all of the cells have tested and no signal existed. In such a case, a block 610 is reached and at block 612 x is set equal to n+1. In other words, the first cell is selected at this block and the focal path containing the first cell is selected at block 614. Also, the selection process ends at a block 616 until starting again at block 520. Thus, although no signal has been detected, the system continues to operate until selection again commences at block 520.

Returning to block 608, the answer normally would be "yes". That is, at block 602, in the example, it was just determined that n was equal to four and in the immediately preceding cycle through block 528 n was reduced to n=3. Hence, when block 608 is reached n is still at 3. Thus, the "yes" branch of block 608 is followed to block 528 and n is reduced by one to a new value of n=2. At block 530, the amplitude of the signal detected from light traveling along the focal path associated with the second cell is stored in memory $T_2$. If, at block 532, it is determined that the amplitude stored in $T_1$ was greater than the amplitude stored in $T_2$ plus a difference signal, then the focal path associated with the third cell is of a better focus than the focal path associated with the second cell. In this instance, at block 534, the signal in memory $T_1$ is replaced by the signal stored in $T_2$. In addition, at block 536, it is determined whether or not n is less than the maximum number of cells. In this case, n is equal to two so the answer is "yes". At block 538, n is then incremented by one to a new value of n=3. At block 540 the amplitude of the detected signal associated with the focal path containing the third cell is stored in $T_2$. Also at block 542 it is determined whether or not the amplitude signal stored in memory $T_1$ is greater than the amplitude signal stored in $T_2$ plus a difference signal. If the answer happened to be "yes" (not the case in this example), the focal path containing the second cell would be in better focus than the focal path containing the third cell. At a block 620 n would then be reduced from three to two. Furthermore, the second cell would then be selected as indicated at block 622 and the focal path associated with this second cell would be selected as the playback focal path at a block 624. Furthermore, selection would end at a block 626, until such time as it again starts at block 520. Returning to block 532, in this example, the answer at this point would be "no", confirming that the second cell and associated focal path did not result in an improvement of the focus. Thus, a block 604 is reached. At block 604, assuming the third cell was of an improved focus by at least the difference signal delta, then the "yes" branch from block 604 is followed to block 586 and testing continues as previously explained.

To conclude the discussion, assuming at block 602 we had not been dealing with the last cell, the "no" branch from this block would be followed to a block 630 and n would be incremented by one. Also, assuming that at block 602 n had been equal to 2, then at block 630 n would then be set to n=3. At block 632, the amplitude of the detected signal associated with the focal path containing the third cell is stored in $T_2$. Also, at decision block 634, it is then determined whether or not the amplitude signal stored in $T_2$ is greater than the amplitude signal stored in $T_1$ plus a difference signal. If the answer is "yes", this indicates that the third cell and associated focal path are in better focus than the second cell and its associated focal path. In such a case, the procedure continues at block 534 via the "yes" branch from block 634.

In contrast, if the answer at block 634 was "no", a decision block 636 is reached at which point it is determined whether or not the signal stored in $T_1$ is greater than the signal stored in $T_2$ plus the difference signal. If the answer is "yes", this indicates that the focal path containing the second cell is of an improved focus in comparison to that containing the third cell. The procedure then continues at block 570 to test the focus of the focal path containing the first cell. If the answer at block 636 had been "no", this would indicate that the amplitude signal stored in memories $T_1$ and $T_2$ are equal, and the process returns to block 600 and testing again continues.

In this manner, in accordance with the flow chart of FIG. 24, the apparatus evaluates the focus resulting from playback light traveling along the various focal paths, commencing with the focal path in use immediately prior to a selection process. Hence, since in most instances the focus will vary only slightly, the flow chart of FIG. 24 results in a faster selection of a focal path providing an improved focus.

Having illustrated and described the principles of my invention with reference to preferred embodiments, it should be apparent to those persons skilled in the art that such invention may be modified in arrangement and detail without departing from such principles. For example, one skilled in the art can readily develop a wide range of methods of testing the focal of light traveling along the various paths and selecting a focal path as the playback focal path which results in improved focus. I claim as my invention all such modification as come within the true spirit and scope of the following claims.

I claim:

1. A focusing apparatus for focusing light from a playback light source on a digital optical data record, the data record containing at least one layer of recorded data, said focusing apparatus comprising means for providing plural simultaneous focal paths of different lengths intersecting the layer of recorded data and also including circuit means for selecting a playback focal path from said focal paths and for shifting the playback focal path from one of said focal paths to another such that light from the playback light source which is traveling along the playback focal path is substantially focused on the recorded data.

2. A focusing apparatus according to claim 1 in which said circuit means comprises means operational during playback of the data record for comparing the focus of the light from the playback light source which is traveling along a focal path with the focus of the light from the playback light source which is traveling along at least one other focal path and for selecting as the playback focal path the focal path from the compared focal paths which provides the best focus.

3. A focusing apparatus according to claim 1 in which said circuit means comprises means for comparing the focus of the light from the playback light source which is traveling along each of the focal paths with a reference focus and for selecting as said playback focal path a focal path which results in a focus at least equal to the reference focus.

4. A focusing apparatus for playing back a digital optical data record, the data record containing at least one layer of recorded data, comprising:
light transmitting means for directing light to the optical data record for modulation by the recorded data;
light receiving means for receiving the modulated light and for producing an output signal representing the recorded data;
support means for supporting said light transmitting means and said light receiving means so as to provide plural simultaneous focal paths of different lengths between said light transmitting means and said light receiving means; and
selection circuit means for selecting one of said focal paths as a playback focal path, and for shifting the playback focal path from one of said focal paths to another such that light traveling along the playback focal path is focused on the recorded data layer and modulated thereby so that the output signal represents the recorded data.

5. An apparatus according to claim 4 in which said light receiving means comprises an array of plural light detector means each detector means of the array comprising means for receiving light and for producing an output representing the received light;
said support means supporting said array such that each of the light detector means of the array is directed toward a common bit of data on the record and so that a focal path of a different length is provided through said data bit between said light transmitting means and each of the light detector means of the array; and
said selection circuit means comprises means for selecting one of said detector means such that the playback focal path is provided between said light transmission means and said selected detector means.

6. An apparatus according to claim 5 in which said light receiving means includes beam splitter means positioned to split the modulated light and direct a portion thereof to each of the detector means.

7. An apparatus according to claim 5 in which said light receiving means includes single plate combiner means positioned to direct a portion of the modulated light to each of said detector means.

8. An apparatus according to claim 5 in which said selection circuit means comprises means for comparing the amplitude of the output signals from each of the detector means and for selecting as said one detector means the detector means having an output of the highest amplitude.

9. An apparatus according to claim 5 in which said selection circuit means comprises means for comparing the amplitude of the output signals from said detector means with the amplitude of a reference signal and for selecting as said one detector means a detector means having an output signal of an amplitude at least equal to the amplitude of the reference signal.

10. An apparatus according to claim 5 in which said light transmitting means includes single plate combiner means positioned to receive light from each said source means and direct the light it receives toward the common data bit.

11. An apparatus according to claim 4 in which said light transmitting means comprises an array of plural light transmitting source means;
said support means supporting said array such that each said source means of the array is directed toward a common bit of data on the data record and so that a focal path of a different length is provided through said data bit between said light receiving means and each said source means of the array; and
said selection circuit means comprises means for selecting one of said source means such that the playback focal path is provided between said light transmission means and said selected source means.

12. An apparatus according to claim 11 in which said light transmitting means includes beam splitter means positioned to receive light from each said source means and direct the light it receives toward the common data bit.

13. An apparatus according to claim 11 in which said selection circuit means comprises means for selectively controlling the transmission of light from one of said source means at a time, said selection circuit means also comprising means for comparing the amplitudes of the output signals from said light receiving means resulting from the transmission of light from each of said source means and for selecting as said one source means the source means causing the light receiving means to produce an output signal of the highest amplitude.

14. An apparatus according to claim 11 in which said selection circuit means comprises means for selectively controlling the transmission of light from one of said source means at a time, said selection circuit means also comprising means for comparing the amplitude of the output signal from said light receiving means in response to the transmission of each of said source means with a reference amplitude signal and for selecting as said one source means causing the light receiving means to produce an output signal at least equal to the amplitude of the reference signal.

15. A focusing apparatus for playing back a digital optical data record, the data record having at least one layer of recorded data, comprising:
plural light source means each for transmitting light to the data record for modulation by the recorded data;
light detector means for receiving the modulated light and for producing an output signal representing the recorded data;
support means for supporting said plural light source means with respective ends of said light source means at different distances from the data record so as to provide plural simultaneous focal paths of different lengths, one such focal path extending from each said light source means through data on the data record to said detector means.

16. An apparatus according to claim 15 in which said plural light source means comprises an array of light emitting diodes.

17. An apparatus according to claim 15 in which said plural light source means comprises a bundle of optical fibers and a source of light transmitting light to one end of each fiber, the opposite ends of at least certain of said fibers being separated from one another and supported by said support means at different distances from the data records to provide the focal paths.

18. An apparatus according to claim 15 in which said plural light source means comprises at least two separate bundles of optical fibers, a separate light source associated with each bundle for transmitting light to one end of its associated bundle of fibers so that light is transmitted from one end of each fiber to its opposite end, the opposite end of at least certain of said fibers being separated and supported by said support means at different distances from the data records to provide the focal paths.

19. A focusing apparatus for playing back a digital optical data record, the data record having at least one layer of recorded data, comprising:
plural light source means each for transmitting light to the data record for modulation by the recorded data;
light detector means for receiving the modulated light and for producing an output signal representing the recorded data;
support means for supporting said plural light source means so as to provide plural simultaneous focal paths of different lengths, one such focal path extending from each said light source means through data on the data record and to said detector means;
said plural light source means comprising at least two separate bundles of optical fibers, a separate light source associated with each bundle for transmitting light to one end of its associated bundle of fibers so that light is transmitted from one end of each fiber to its opposite end, the opposite end of at least certain of said fibers being separated and supported by said support means to provide the focal paths;
each said light source transmitting a different color of light to its associated bundle of fibers, said fibers being supported by said support means such that fibers from different bundles are interleaved so that light from adjacent fibers is of a different color, said detector means including means for detecting light of each color so that when said detector means is receiving light of one color interference due to light from adjacent fibers is minimized.

20. A focusing apparatus for playing back a digital optical data record, the data record having at least one layer of recorded data, comprising:
plural light sourece means each for transmitting light to the data record for modulation by the recorded data;
light detector means for receiving the modulated light and for producing an output signal representing the recorded data;
support means for supporting said plural light source means so as to provide plural simultaneous focal paths of different lengths, one such focal path extending from each said light source means through data on the data record and to said detector means;
said plural light source comprising at least two separate bundles of optical fibers, a separate light source associated with each bundle for transmitting light to one end of its associated bundle of fibers so that light is transmitted from one end of each fiber to its opposite end, the opposite end of at least certain of said fibers being separated and supported by said support means to provide the focal paths;
each said light source transmitting a different polarity of light to its associated bundle of fibers, said fibers being supported by said support means such that fibers from different bundles are interleaved so that light from adjacent fibers is of a different polarity, said detector means including means for detecting light of each polarity so that when said detector means is receiving light of one polarity interference due to light from adjacent fibers is minimized.

21. A focusing apparatus for playing back a digital optical data record, the data record having at least one layer of recorded data, comprising:
plural light source means each for transmitting light to the data record for modulation by the recorded data;
light detector means for receiving the modulated light and for producing an output signal representing the recorded data;
support means for supporting said plural light source means so as to provide plural simultaneous focal paths of different lengths, one such focal path extending from each said light source means through data on the data record and to said detector means;
said plural light source means comprising an array of light sources supported by said support means, adjacent light sources of said array transmitting light of a different characteristic to said detector means, said detector means having a portion thereof sensitive to each characteristic of transmitted light for producing an output signal corresponding to the modulated light of the characteristic to which it is sensitive.

22. An apparatus according to claim 21 in which the characteristic of light is its color.

23. An apparatus according to claim 21 in which the characteristic of light is its polarity.

24. A focusing apparatus for playing back a digital optical data record, the data record having at least one layer of recorded data, comprising:
light transmitting means for transmitting light to the data record for modulation by the recorded data;
plural fiber optic fibers each for receiving modulated light at a first end thereof and for transmitting the received lights to their opposite end;
detector means for receiving the light from the opposite ends of said fibers; and
support means for supporting the first ends of said fibers at different distances from the data record so as to provide plural simultaneous focal paths of different lengths, one such focal path extending from said light transmitting means through data on the data record and each said fiber to said detector means.

25. A focusing apparatus according to claim 24 in which said light transmitting means comprises means for transmitting light of differing characteristics and said detector means is sensitive to the differing characteristics.

26. An apparatus according to claim 25 in which the characteristic is color, said detector means comprises means for detecting light of a first color from selected fibers and means for detecting light of a second color from others of said fibers.

27. An apparatus according to claim 25 in which the characteristic is polarity, said detector means comprising means for detecting light of a first polarity from selected fibers and means for detecting light of a second polarity from others of said fibers.

28. A focusing apparatus for playing back a digital optical data record, the data record containing at least one layer of recorded data, the recorded data being arranged in side-by-side tracks of data with each track having successive bits of data, the data record also containing area of recorded focus test data, comprising:
light transmitting means for directing light to the optical data record for modulation by the recorded data;
light receiving means for receiving the modulated light and for producing signal representing the recorded data;
support means for supporting said light transmitting means and said light receiving means so as to provide plural simultaneous focal paths of different lengths between said light transmitting means and said light receiving means, each such focal path passing through a different bit of recorded data along the same track of recorded data; and
selection circuit means for selecting one of said focal paths as a playback focal path such that light traveling along the playback focal path is focused on the recorded data layer and modulated thereby so that the output signal represents the recorded data.

29. An apparatus according to claim 28 in which said light receiving means comprises an array of plural light detector means, each detector means of the array comprising means for receiving light and for producing an output representing the received light;
said support means supporting said array such that each of the light detector means of the array is directed toward a different bit of data on the same track of data and so that a focal path of a different length is provided from said light transmitting means through a respective data bit and to each of the light detector means of the array; and
said selection circuit means comprises means for shifting the playback focal path from one of said focal paths including one of said detector means to another of said focal paths including another of said detector means, such shifting taking place at times focus test data is played back from the data record, when said another focal path provides an improved focus of light on the data record in comparison to the focus provided by said one focal path.

30. An apparatus according to claim 29 in which said selection circuit means includes means for continuously monitoring the outputs of said detector means and selecting said another focal path when the amplitude of the output of said another detector means is higher than the amplitude of the output of said one detector means.

31. An apparatus according to claim 28 in which said light transmission means comprises an array of plural light source means,
said support means supporting said array such that each of the light source means of the array is directed toward a different bit on the same track of data and so that a focal path of a different length is provided from each light source means through a respective one of said data bits and to said light receiving means; and
said selection circuit means comprises means for shifting the playback focal path from a one of said focal paths including a one of said light source means to another of said focal paths including another of said light source means, such shifting taking place at times focus test data is played back from the data record, when said another focal path provides an improved focus of light on the data record in comparison with the focus provided by said one focal path.

32. A focusing apparatus for playing back a digital optical data record, the data record containing at least one layer of recorded data, the recorded data being arranged in side-by-side tracks of data with each track having successive bits of data, the data record also containing areas of recorded dummy data, comprising:
light transmitting means for directing light to the optical data record for modulation by the recorded data;
light receiving means for receiving the modulated light and for producing an output signal representing the recorded data;
support means for supporting said light transmitting means and said light receiving means so as to provide plural simultaneous focal paths of different lengths between said light transmitting means and said light receiving means, each such focal path passing through a bit of recorded data on a separate track of recorded data; and
selection circuit means for selecting one of said focal paths as a playback focal path and for shifting the playback focal path from one of said focal paths to another such that light traveling along the playback focal path is focused on the recorded data layer and modulated thereby so that the output signal represents the recorded data.

33. A focusing apparatus for playing back a digital optical data record, the data record containing at least one layer of recorded data, comprising:
light transmitting means for directing light to the optical data record for modulation by the recorded data;
light receiving means for receiving the modulated light and for producing an output signal representing the recorded data; and
light focal path adjustment means positioned in the light path between said light transmitting means and said light receiving means, said adjustment means comprising a mirror means with a first surface substantially one hundred percent reflective and having a pinhole aperture therethrough for passage of light, and a second surface of approximately ninety percent reflectivity, said adjustment means providing multiple simultaneous focal paths of different lengths between said light transmitting means and said light receiving means, the length of each such focal path being related to the number of reflections light makes between said first and second surfaces before it exits from said adjustment means.

34. An apparatus according to claim 33 in which said light receiving means comprises a light detector positioned in light receiving relationship with the pinhole aperture so as to receive light passing through the aperture;

said light transmitting means comprising means for directing a converging beam of modulated light through the second surface and toward the first surface, a first portion of said light beam travelling on a first focal path directly from said first surface to the pinhole aperture and exiting through said aperture, a second portion of said light beam traveling on a second focal path by being reflected from said first surface toward said second surface and back toward said first surface with a portion thereof exiting through the pinhole aperture, a portion of the light beam following successive focal paths until a focal path is followed which converges the beam on the pinhole aperture.

35. A focusing apparatus for playing back a digital optical data record, the data record containing at least one layer of recorded data comprising:
light transmitting means for directing light to the optical data record for modulation by the recorded data;
light receiving means for receiving the modulated light and for producing an output signal representing the recorded data;
said light transmitting means comprising a playback line light source generating means for generating a line of playback light, said last named means comprising a fiber optic fiber having particles of approximately one wavelength of light embedded therein for forwardly scattering light traveling along the fiber.

* * * * *

UNITED STATES PATENT AND TRADEMARK OFFICE
CERTIFICATE OF CORRECTION

PATENT NO. : 4,460,989

DATED : July 17, 1984

INVENTOR(S) : James T. Russell

It is certified that error appears in the above-identified patent and that said Letters Patent is hereby corrected as shown below:

Column 2, line 67, "the" should be --each--.

Column 7, line 46, "mirros" should be --mirrors--.

Column 8, line 38, after "dummy" insert --or focus test--.

Column 14, line 2, after "(5)" delete "2".

Column 18, line 27, "ANd" should be --AND--.

UNITED STATES PATENT AND TRADEMARK OFFICE
CERTIFICATE OF CORRECTION

PATENT NO. : 4,460,989                         Page 2 of 2
DATED      : July 17, 1984
INVENTOR(S): James T. Russell It is certified that error appears in the above-identified patent and that said Letters Patent is hereby corrected as shown below:

```
Column 25, line 14, "detectd" should be --detected--.
Column 29, line 47, before "record" insert --data--.
Column 30, line 52, after "means" (first occurrence)
     insert --a source means--.
Column 32, line 1, after "source" insert --means--.
Column 33, line 14, change "area" to --areas--.
Column 33, line 19, before "signal" insert --an output--.
```

Signed and Sealed this

*Twenty-ninth* Day of *October 1985*

[SEAL]

*Attest:*

DONALD J. QUIGG

*Attesting Officer*

Commissioner of Patents and Trademarks—Designate